United States Patent
Sharma et al.

(10) Patent No.: US 12,507,188 B2
(45) Date of Patent: Dec. 23, 2025

(54) TECHNIQUES FOR LOW POWER SYNCHRONIZATION SIGNAL MEASUREMENTS

(71) Applicant: QUALCOMM Incorporated, San Diego, CA (US)

(72) Inventors: Prashant Sharma, San Jose, CA (US); Ahmed Elshafie, San Diego, CA (US); Changhwan Park, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/194,426

(22) Filed: Mar. 31, 2023

(65) Prior Publication Data
US 2024/0334353 A1   Oct. 3, 2024

(51) Int. Cl.
*H04W 56/00* (2009.01)
*H04W 24/10* (2009.01)

(52) U.S. Cl.
CPC ....... *H04W 56/0015* (2013.01); *H04W 24/10* (2013.01)

(58) Field of Classification Search
CPC .............. H04W 56/0015; H04W 24/10; H04W 52/0216; H04W 52/0229; H04W 52/0235; H04W 52/0274; H04W 56/001
See application file for complete search history.

(56) References Cited

U.S. PATENT DOCUMENTS

2024/0284331 A1* 8/2024 Bhatoolaul ....... H04W 52/0245
2024/0334354 A1* 10/2024 Si ......................... H04B 17/336

OTHER PUBLICATIONS

International Search Report and Written Opinion—PCT/US2024/017864—ISA/EPO—Jul. 22, 2024.
Panasonic: "Discussion on Subband Non-overlapping Full Duplex", 3GPP TSG RAN WG1 #112, R1-2300918, vol. 3GPP RAN 1, No. Athens, Greece, Feb. 27, 2023-Mar. 3, 2023, Feb. 17, 2023, 11 Pages, XP052248061, Sections 1-3.
Wilus Inc: "Discussion on Subband Non-overlapping Full Duplex", 3GPP TSG RAN WG1 #112bis-e, R1-2303830, vol. 3GPP RAN 1, No. Online, Apr. 17, 2023-Apr. 26, 2023, Apr. 7, 2023, 21 Pages, XP052294379, Sections 1-3.

* cited by examiner

*Primary Examiner* — Charles C Jiang
*Assistant Examiner* — Shawn D Miller
(74) *Attorney, Agent, or Firm* — Holland & Hart LLP

(57) ABSTRACT

Methods, systems, and devices for wireless communications are described. A user equipment (UE) may perform measurements on one or more synchronization signals using a low power wake-up radio (WUR) of the UE. For example, the UE may receive first control information associated with a low power synchronization signal. In some examples, the first control information may include a periodicity of the low power synchronization signal and an indication of which measurements to perform on the low power synchronization signals. Based on the first control information, the UE may monitor, using the low power WUR, a resource occasion for the low power synchronization signal. Based on monitoring and receiving the low power synchronization signals, the UE may perform, using the low power WUR, the measurements of the low power synchronization signal. The UE may transmit a report including the measurements of the low power synchronization signal based on performing the measurements.

30 Claims, 16 Drawing Sheets

TECHNIQUES FOR LOW POWER SYNCHRONIZATION SIGNAL MEASUREMENTS

FIELD OF TECHNOLOGY

The following relates to wireless communications, including techniques for low power synchronization signal measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for low power synchronization signal measurements. For example, the described techniques provide for a user equipment (UE) to perform MDT measurements on a low power synchronization signal using a low power wake-up radio (WUR), which may result in reduced power consumption at the UE and increased coordination between the UE and the network entity. In some examples, the UE may receive first control information associated with the low power synchronization signal, where the first control information may include a periodicity of the low power synchronization signal and an indication of which measurements to perform on the low power synchronization signals. Based on the first control information, the UE may monitor, using the low power WUR, a resource occasion for the low power synchronization signal and perform the measurements of the low power synchronization signal. The UE may log the measurements performed on the synchronization signal and periodically transmit a report including the measurements of the low power synchronization signal to the network entity. The network entity may use such measurements to evaluate the network and adjust network functionalities accordingly.

DETAILED DESCRIPTION

Figure 1:
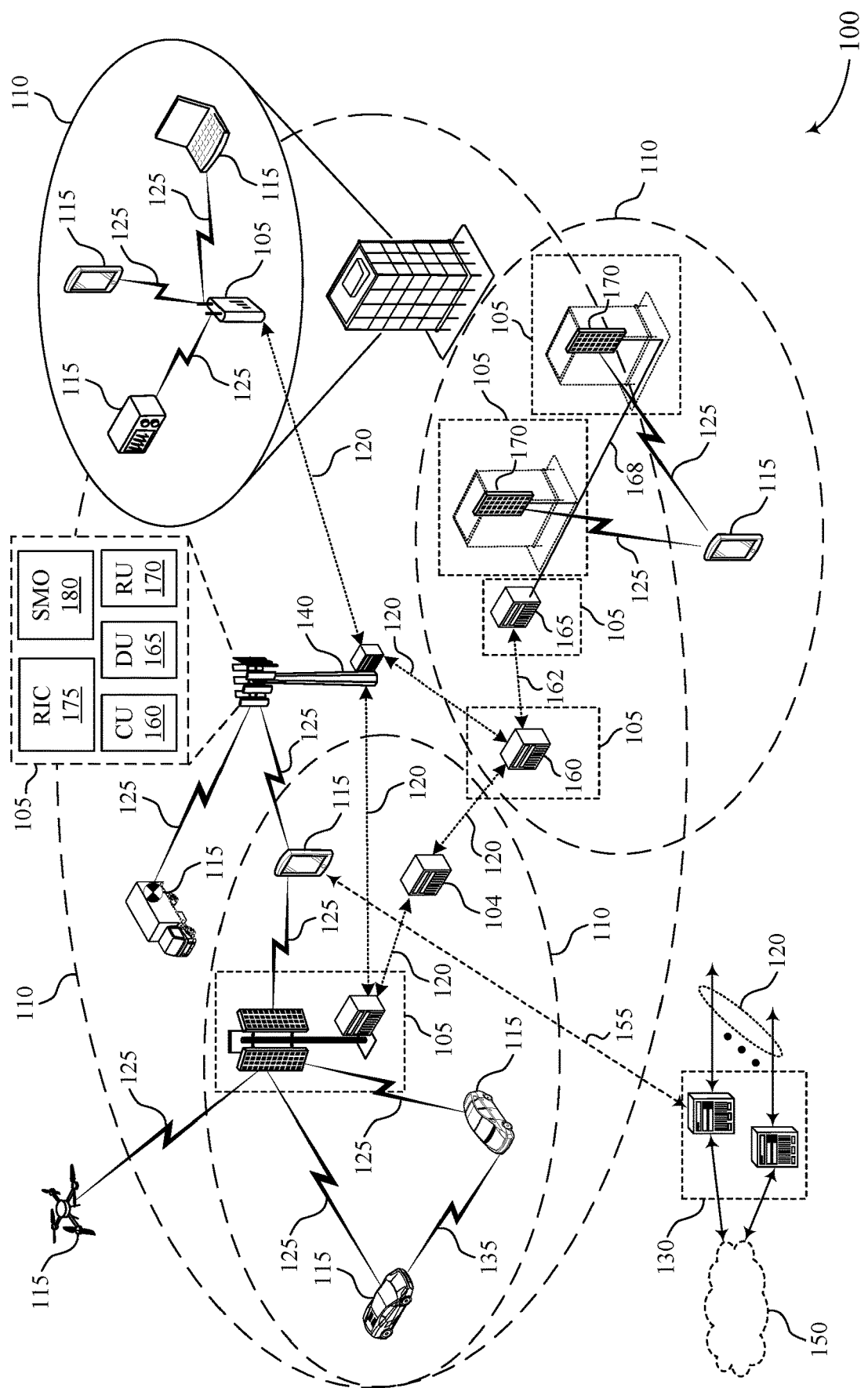
FIG. 1 shows an example of a wireless communications system that supports techniques for low power synchronization signal measurements in accordance with one or more aspects of the present disclosure.

In some wireless communications systems, a user equipment (UE) may periodically perform a minimization of drive test (MDT) in order to provide a network entity with channel measurements, such that the network entity may monitor and detect coverage problems, evaluate a quality of service of the channel, and adjust network capacity based on the channel measurements. For example, the UE may periodically receive a synchronization signal block (SSB), perform and log measurements of the SSB, and report the measurements to the network entity. In this way, the network entity may periodically receive channel measurements and adjust network functionality accordingly.

Further, in some cases, a UE may operate in an idle mode operation (e.g., such as radio resource control (RRC) inactive modes) during times when traffic between the network entity and the UE is relatively low. In such cases, the UE may implement a low power wake-up radio (WUR) to monitor for wake-up signals (WUSs) while a main radio of the UE operates in a deep sleep mode, thereby reducing power consumption and increasing energy savings at the UE during idle mode operations. In such cases, however, the UE may not be able to perform the MDT during idle mode operations due to the main radio of the UE operating in the deep sleep mode. For example, the UE may not wake-up the main radio to perform the MDT in order to maintain reduced power consumption. As such, the UE may not perform and log measurements of the SSB, which may result in the network entity being unable to properly evaluate the channel and lead to less coordination between the UE and the network entity.

The techniques, methods, and devices described herein may enable the UE to perform the MDT using the low power WUR and low power synchronization signals. For example, the UE may receive first control information (e.g., such as RRC or medium access control (MAC) signaling) associated with a low power synchronization signal, where the first control information indicates at least a periodicity of the low power synchronization signal and one or more measurements the UE is to perform on the low power synchronization signal. Based on the first control information, the UE may monitor for, and receive, the low power synchronization signal and perform the measurements on each instance of the low power synchronization signal. The UE may transmit a report that includes the measurements of each instance of the low power synchronization signal, thereby completing the MDT procedure using a low power WUR and low power synchronization signal.

By enabling the UE to perform MDT measurements of low power synchronization signals, the UE may continue to experience increased power savings in the idle mode, while also providing the network entity 105-a with MDT measurements. In this way, the network entity may be able to continue to monitor and adjust network functions according to the MDT measurements, leading to improved coordination between the UE and the network entity during idle mode operations.

Aspects of the disclosure are initially described in the context of wireless communications systems. Aspects of the disclosure are further described in the context of a timing diagram and a process flow. Aspects of the disclosure are further illustrated by and described with reference to apparatus diagrams, system diagrams, and flowcharts that relate to techniques for low power synchronization signal measurements.

FIG. 1 shows an example of a wireless communications system 100 that supports techniques for low power synchronization signal measurements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for low power synchronization signal measurements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the UE 115 may periodically perform a MDT in order to provide the network entity 105 with channel measurements, such that the network entity 105 may monitor and detect coverage problems, evaluate a quality of service of the channel, and adjust network capacity based on the channel measurements. For example, the UE 115 may periodically receive a SSB, perform and log measurements of the SSB, and report the measurements to the network entity 105. In this way, the network entity 105 may periodically receive channel measurements and adjust network functionality accordingly.

Further, in some cases, a UE 115 may operate in an idle mode operation (e.g., such as RRC inactive modes) during times when traffic between the network entity 105 and the UE 115 is low. In such cases, the UE 115 may implement a low power WUR to monitor for WUSs while a main radio of the UE 115 operates in a deep sleep mode, thereby reducing power consumption and increasing energy savings at the UE 115 during idle mode operations. In such cases, however, the UE 115 may not be able to perform the MDT during idle mode operations due to the main radio of the UE 115 operating in the deep sleep mode. For example, the UE 115 may not wake-up the main radio to perform the MDT in order to reduce power consumption at the UE 115. As such, the UE 115 may not perform and log measurements of the SSB, which may result in the network entity 105 being unable to properly evaluate the channel and lead to less coordination between the UE 115 and the network entity 105.

The techniques, methods, and devices described herein may enable the UE 115 to perform the MDT using the low power WUR and low power synchronization signals, resulting in increased coordination between the UE 115 and the network entity 105. For example, the UE 115 may receive first control information (e.g., such as RRC or MAC signaling) associated with a low power synchronization signal, where the first control information indicates at least a periodicity of the low power synchronization signal and an indication of which measurements to perform on the low power synchronization signal. Based on the first control information, the UE 115 may monitor for, and receive, the low power synchronization signal and perform the measurements on each instance of the low power synchronization signal. The UE 115 may transmit a report that includes the measurements of each instance of the low power synchronization signal, thereby completing the MDT procedure using a low power WUR and low power synchronization signal.

Figure 2:
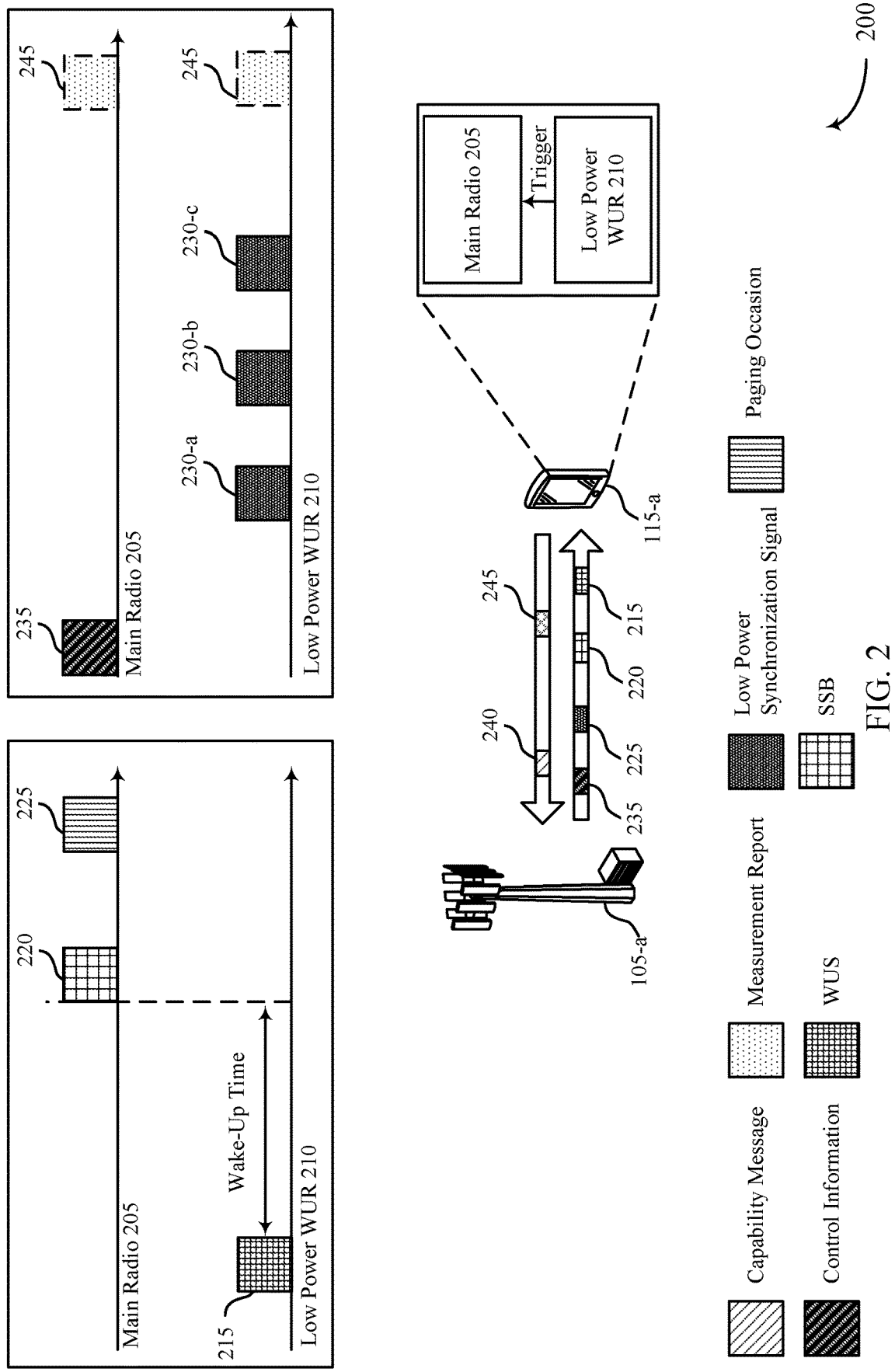
FIG. 2 shows an example of a wireless communications system that supports techniques for low power synchronization signal measurements in accordance with one or more aspects of the present disclosure.

FIG. 2 shows an example of a wireless communications system 200 that supports techniques for low power synchronization signal measurements in accordance with one or more aspects of the present disclosure. The wireless communications system 200 may implement, or be implemented by, aspects of wireless communications system 100. For example, the wireless communications system 200 may include a network entity 105-*a* and a UE 115-*a*, which may be examples of corresponding devices described herein with reference to FIG. 1. Further, the wireless communications system 200 may implement techniques for performing MDT measurements during idle mode operations at the UE 115-*a*.

In some cases, the UE 115-*a* may operate in an active mode (e.g., such as an RRC active mode) and communicate with the network entity 105-*a* via various uplink and downlink channels. To facilitate active communications, the UE 115-*a* may include a main radio 205, such that the UE may receive one or more downlink messages or transmit one or more uplink messages using the main radio 205. At times, data communication, or traffic, between the UE 115-*a* and the network entity 105-*a* may subside, and as such, the UE 115-*a* may enter into an idle mode (e.g., such as RRC inactive or sleep mode) in order to reduce power consumption at the UE 115-*a*.

To achieve reduced power consumption in the idle mode, the UE 115-*a* may implement a low power WUR 210 to monitor for low power WUSs 215. The low power WUR 210 may be an example of a radio receiver circuit designed to have a lower energy consumption relative to the main radio 205. Thus, when there is no data to be communicated between the UE 115-*a* and the network entity 105-*a*, the main radio 205 of the UE 115-*a* may enter into an ultra-low power state until data is to be received or transmitted. As such, the UE 115-*a* may use the low power WUR 210 to actively monitor for low power WUSs 215, thereby reducing power consumption at the UE 115-*a*. When there is data to be communicated between the UE 115-*a* and the network entity 105-*a*, the UE 115-*a* may receive, via the low power WUR 210, the low power WUS 215 and trigger (e.g., initiate) the main radio 205 of the UE 115-*a* to wake-up and resume active communications (e.g., data is received at the main radio 205 of the UE 115-*a*).

By implementing the low power WUS 215 in the wireless communications system 200, the network entity 105-*a* may reduce unnecessary paging receptions at the UE 115-*a*. For example, the network entity 105-*a* may transmit the low power WUS 215 if there is a paging occasion 225 intended for the UE 115-*a*. As such, if the low power WUS 215 is detected by the low power WUR 210, the low power WUR 210 may trigger the main radio 205 of the UE 115-*a* to wake-up. Based on activating the main radio 205, the UE 115-*a* may monitor, via the main radio 205, for an SSB 220 in order to synchronize with the network entity 105-*a* prior to the paging occasion 225. In response to synchronization, the UE 115-*a* may monitor the paging occasion 225 and receive downlink messages. Alternatively, if the low power WUR 210 does not detect a low power WUS 215, then the UE 115-*a* may maintain the main radio 205 in the ultra-low power sleep mode (e.g., deep sleep mode) in order to reduce power consumption and increase energy saving.

Further, in some cases, the UE 115-*a* may perform a MDT procedure to perform, log, and report measurements of one or more SSBs 220. For example, as defined in a standards body (e.g., such as in clause 4.3.2 and 4.3.3 of TS 38.133 of the 3rd generation partnership project (3GPP)), the UE 115-*a* may perform the MDT procedure to measure the SSB 220, log such measurements, and report such measurements to the network entity 105-*a*. Based on the reported measurements (e.g., MDT measurements), the network entity 105-*a* may monitor and detect coverage problems in the network, verify quality of service metrics, assess user experience from a network perspective, and assist in network capacity extension.

For example, while operating in the idle mode, the main radio 205 of the UE 115-*a* may periodically wake-up and monitor for one or more SSBs 220. As such, the UE 115-*a* may perform and log one or more measurements of such SSBs 220 as part of the MDT procedure. In some cases, the UE 115-*a* may measure any one of an inter-radio access technology (RAT) evolved universal terrestrial radio access (E-UTRA) frequency division duplexing (FDD) and time division duplexing (TDD) reference signal received power (RSRP), an inter-RAT E-UTRA FDD and TDD reference signal received quality (RSRQ), a synchronization signal RSRP per cell, a synchronization signal RSRQ per cell, a synchronization signal RSRP per SSB index of the serving cell, a synchronization signal RSRQ per SSB index of the serving cell, or the like. Further, during the MDT in idle mode, the UE 115-*a* may identify and log the SSB index with the highest measured RSRP, RSRQ, or both relative to all measured SSB indexes of the serving cell (e.g., the best SSB index of the serving cell). In some cases, the UE 15-*a* may identify and log the quantity of SSBs 220 with different SSB indices that are above a measurement threshold (e.g., absThreshSS-BlocksConsolidation) for all detected cells whose cell-ranking criterion R value is within a measurement range (e.g., rangeToBestCell) of the cell-ranking criterion R value of the highest ranked cell.

In some cases, however, if the UE 115-*a* supports, or otherwise implements, a low power WUR 210, the UE 115-*a* may not be able to support the MDT procedure during idle mode operations. For example, if the UE 115-*a* includes the low power WUR 210, the UE 115-*a* may maintain the main radio 205 in the ultra-low power sleep mode (e.g., deep sleep mode). As such, the main radio 205 may not be able to periodically wake-up and perform the measurements of the SSBs 220 in an effort reduce power and increase energy savings. That is, in an effort to conserve energy at the UE 115-*a*, the UE 115-*a* may maintain the main radio 205 in the ultra-low power mode, resulting in the inability to perform the measurements of the SSBs 220 using the main radio 205. Because MDT enables the network entity to identify coverage holes and optimize overall network performance with significant cost reductions, the UE 115-*a* and the network entity 105-*a* may experience a reduction in channel quality and less coordination by foregoing the MDT procedure. Thus, mechanisms may be desired to support MDT for UEs 115 that implement low power WURs 210.

The techniques, methods, and devices described herein may enable the UE 115-*a* to perform measurements (e.g., MDT measurements) on low power synchronization signals 230 using the low power WUR 210. The network entity 105-*a* may use such low power synchronization signals 230, such that the low power WUR 210 may be able to monitor for, and measure, the low power synchronization signals 230. For example, the characteristics of the low power synchronization signal 230 may be different from the characteristics of the SSB 220. In some examples, the low power synchronization signals 230 may include an on-off keying waveform, be processed in the time domain, have an increased detection rate, include a primary synchronization signal (PSS) or secondary synchronization signal (SSS) sequences, or a combination thereof. Such characteristics may enable the low power WUR 210 to detect and measure the low power synchronization signal with relative ease compared to the detection and measurement of the SSB 220. Alternatively, in some examples, the low power synchronization signals may include one or more characteristics of the SSB 220, or be an SSB 220.

In some examples, a standards body (e.g., such as the 3GPP standards) may define low pow synchronization signal based measurement logging to support MDT for UEs 115 equipped with a low power WUR 210. In such examples, a subset of legacy measurements for MDT may be supported for low power synchronization signal 230 based MDT. That is, the UE 115-*a* may perform one or more measurements of the low power synchronization signals 230 using the low power WUR 210, where the MDT measurements may be a subset of the measurements associated with the SSBs 220. Such measurements may include an RSRP of the low power synchronization signal 230 per cell, an RSRQ of the low power synchronization signal 230 per cell, an RSRP of the low power synchronization signal 230 per SSB index of the serving cell, an RSRQ of the low power synchronization signal 230 per SSB index of the service cell, or the like.

Further, the UE 115-*a* may identify and log the index (e.g., SSB index) of the low power synchronization signal 230 with the highest measured RSRP, RSRQ, or both (e.g., identify the best low power synchronization signal index of the serving cell). In some examples, the UE 115-*a* may log position based measurements using low power synchronization signals 230. Such measurements may be logged at the UE 115-*a*, where each measurement is associated with a time stamp. It should be understood that the above examples may not be all inclusive and do not preclude other measurements from being defined as part of the low power synchronization signal 230 measurements for MDT.

In some examples, the network entity 105-*a* may transmit first control information 235 associated with the low power synchronization signals 230. The first control information may include a measurement configuration for low power synchronization signals 230, which may be separate from a measurement configuration for SSBs 220. The measurement configuration may include a log duration (e.g., periodicity) of the low power synchronization signals 230 and an indication of which measurement quantities (e.g., which measurement values, such as RSRP, RSRQ, or both) should be included in the measurement report 245. That is, the network entity 105-*a* may indicate, via the first control information 235, one or more measurement types that the UE 115-*a* is to perform for the MDT using low power synchronization signals 230. In such examples, the log duration and the measurement quantities of the low power synchronization signals may be different from measurements based on the SSBs 220.

In some examples, the network entity 105-*a* may configure the first control information according to a capability of the UE 115-*a*. For example, prior to receiving the first control information 235, the UE 115-*a* may transmit a capability message 240 indicating whether the UE supports low power synchronization signal based measurements for MDT. That is, the UE 115-*a* may indicate whether the UE 115-*a* includes a low power WUR 210, whether the UE 115-*a* supports measurements of the low power synchronization signals 230 using the low power WUR 210, whether the UE 115-*a* supports logging such measurements, whether the UE 115-*a* supports reporting such measurements, or the like. Further, the UE 115-*a* may report, via the capability message 240, which measurements of the low power synchronization signals 230 may be supported by the UE 115-*a*. As such, the network entity 105-*a* may configure the first control information 235 (e.g., the periodicity of the low power synchronization signals 230, the measurement types, or the like) in accordance with the capability of the UE 115-*a*.

As an illustrative example, if the UE 115-*a* is a relatively low end or low cost device, then the UE 115-*a* may not be able to support such reporting mechanisms or measurements of the low power synchronization signals 230. Alternatively, if the UE 115-*a* is a mid-tier device, then the UE 115-*a* may support reporting of a limited set of measurement values and types. If the UE 115-*a* is a high end device, then the UE 115-*a* may support reporting of each measurement value and type.

In accordance with the first control information, the UE 115-*a* may use the low power WUR 210 to monitor the resource occasions for the low power synchronization signal 230. That is, the UE 115-*a* may monitor a first resource occasions for the low power synchronization signal 230-*a*. Based on detecting the low power synchronization signal 230-*a*, the UE 115-*a* may measure the low power synchronization signal 230-*a* and log the measurements into a memory of the UE 115-*a*. Additionally, the UE 115-*a* may log a time stamp associated with each measurement in the memory of the UE 115-*a*. The UE 115-*a* may continue such operations (e.g., monitor for, detect, measure, and log) for the low power synchronization signal 230-*b* and the low power synchronization signal 230-*c* in accordance with the indicated log duration.

In some examples, the UE 115-*a* may also log (e.g., store or write to memory) one or more time and frequency offsets (e.g., errors) associated with the low power WUSs 215. For example, the UE 115-*a* may periodically receive the low power WUSs 215 and log one or more time and frequency offsets between the scheduled time and frequency of the low power WUSs 215 and the actual received time and frequency of the low power WUSs 215. Such techniques may be further described herein with reference to FIG. 3.

The UE 115-*a* may transmit the logged measurements, time and frequency offsets, or both via the measurement report 245. In some examples, the UE 115-*a* may transmit the measurement report 245 for measurements of the low power synchronization signals 230 and transmit a separate report for measurements of SSBs 220. In such examples, the UE 115-*a* may indicate via each report whether the measurements were performed using the main radio 205 or the low power WUR 210. That is, the UE 115-*a* may indicate, via the measurement report 245, that the UE 115-*a* performed such measurements using the low power WUR 210. Likewise, the UE 115-*a* may indicate, via the report of measurements of SSBs 220, that the UE 115-*a* performed such measurements using the main radio 205. In this way, the network entity 105-*a* may differentiate between the measurement report 245 (e.g., of the low power synchronization signals 230) and separate MDT reports (e.g., of SSBs 220).

In some other examples, the UE 115-*a* may transmit both the measurements of SSBs 220 and measurements of the low power synchronization signals 230 via the measurement report 245. That is, via the measurement report 245, the UE 115-*a* may include both measurements of the low power synchronization signal and measurements of the SSBs 220. In such examples, because each measurement set is associated with a different measurement configuration and reference signal type (e.g., low power synchronization signal 230 for the low power WUR 210 and SSBs 220 for the main radio 205), the UE 115-*a* may apply a set of offsets (e.g., low power synchronization signal offsets) to the low power synchronization signal measurements.

For example, the measurements of the low power synchronization signal 230 may have different inaccuracies as compared to the measurements of the SSBs 220 (e.g., due to separate configurations and signal types). As such, if the UE 115-*a* transmits the measurement report 245 combining the measurements of the low power synchronization signals 230 and the measurements of the SSBs 220, then the UE 115-*a* may modify the measurements of the low power synchronization signals 230 in accordance with the set of offsets prior combining them with the measurements of the SSBs 220. For example, the UE 115-*a* may add one or more offsets to, or subtract one or more offsets from, the measurements of the low power synchronization signals 230. In this way, the network entity 105-*a* may interpret the measurements of the low power synchronization signals 230 in the same way as those of the SSBs 220. In such examples, the network entity 105-*a* may indicate the set of offsets via the first control information 235 or via second control information (e.g., such as RRC, MAC, or a system information block (SIB)). Alternatively, such offsets may be predefined by a standards body.

In some examples, the UE 115-*a* may include all logged measurement values of the low power synchronization signals 230 in the measurement report 245. That is, the UE 115-*a* may include a threshold quantity of measurement values in the measurement report 245 (e.g., a maximum of X samples). Such threshold quantity of measurement values (e.g., a maximum of X) may be configured by the network entity 105-*a*, via the first control information 235, be predefined in a standard, or be based on a memory capability of the UE 115-*a*. As an illustrative example, the UE 115-*a* may report the measurement values associated with each of the low power synchronization signals 230, where the quantity of reported values is less than or equal to threshold quantity of measurement values.

In some other examples, the UE 115-*a* may report a filtered set of measurements in the measurement report 245. For example, the UE 115-*a* may perform one or more measurements of the low power synchronization signal 230-*a*, the low power synchronization signal 230-*b*, and the low power synchronization signal 230-*c*. As such, the UE 115-*a* may filter the measurement values across a threshold quantity of samples (e.g., Y samples) in accordance with a set of filter coefficients. Such coefficients and the threshold quantity of samples (e.g., Y samples) may be configured by the network entity 105-*a*, via the first control information 235, or be predefined in a standard. As an illustrative example, the threshold quantity of samples may be set to ten. In such examples, the UE 115-*a* may filter the ten most recent measurements of the low power synchronization signals 230 in accordance with the set of filter coefficients. The UE 115-*a* may then report the filtered set of measurements to the network entity 105-*a* via the measurement report 245.

In some other examples, the UE 115-*a* may report a down-sampled set of measurement values in the measurement report 245. For example, the UE 115-*a* may report down sampled measurements from a threshold quantity of past samples (e.g., past Z samples). The threshold quantity of past samples (e.g., Z samples) may be configured by the network entity 105-*a*, via the first control information 235, or be predefined in a standard. As an illustrative example, the UE 115-*a* may log 20 measurement values from the low power synchronization signals 230. In such examples, the network entity 105-*a* may indicate, or the standards define, that the threshold quantity of past samples (e.g., Z) is 10 and that every other measurement should be reported (e.g., down sample the 20 measurements to 10 by reporting every other measurement), then the UE 115-*a* may report every other measurement value, such that 10 measurement values from the 20 measurement values are reported. In this way, the UE 115-*a* may report a down sampled set of measurements.

In some other examples, the UE 115-*a* may report one or more statistical values of the logged measurement values. For example, the UE 115-*a* may report the mean, median, maximum, or minimum values of the logged measurement values. Further, such statistical values may be calculated from a threshold quantity of past samples (e.g., from S samples). The threshold quantity of past samples (e.g., S samples) may be configured by the network entity 105-*a*, via the first control information 235, or be predefined in a standard. As an illustrative example, the UE 115-*a* may log 20 measurement values from the low power synchronization signals 230. In such examples, if the threshold quantity of past samples (e.g., S samples) is equal to 10, then the UE 115-*a* may calculate the mean, median, maximum, or minimum values of the most recent 10 samples (e.g., 10 samples with the most recent time stamps). The UE 115-*a* may then report such values to the network entity 105-*a* via the measurement report 245.

In such examples, the UE 115-*a* may indicate, via the capability message 240, whether the UE 115-*a* supports reporting all logged measurement values, supports reporting a filtered set of measurement values, supports reporting a down sampled set of measurements, or supports reporting statistical values of the measurement values. Further, the UE 115-*a* may indicate, via the capability message 240, the threshold quantity of past values, a filter length, a down sample factor, or the like.

In some examples, the network entity 105-*a* may configure separate measurement and reporting mechanisms for the UE to report measurements based on the low power synchronization signals 230. For example, the network entity 105-*a* may transit, via first control information 235, an indication that the measurement reporting of the low power synchronization signals 230 is to be done outside of the MDT framework. Further, the network entity 105-*a* may indicate that such measurement reporting may be done in the idle mode, connected mode, or both.

The network entity 105-*a* may also indicate whether the measurement report 245 is to be reported periodically, aperiodically, or according to an event trigger. For example, the network entity 105-*a* may indicate a periodicity associated with reporting the measurement report 245. Alternatively, the network entity 105-*a* may transmit an indication for the UE 115-*a* to transmit the measurement report 245. Further, the network entity 105-*a* may indicate which radio of the UE 115-*a* is to report the measurement report 245. For example, the network entity 105-*a* may indicate for the UE 115-*a* to use the low power WUR 210 to report the measurement report 245. Alternatively, the network entity 105-*a* may indicate for the UE 115-*a* to use the main radio of the UE 115-*a* to report the measurement report 245.

Figure 3:
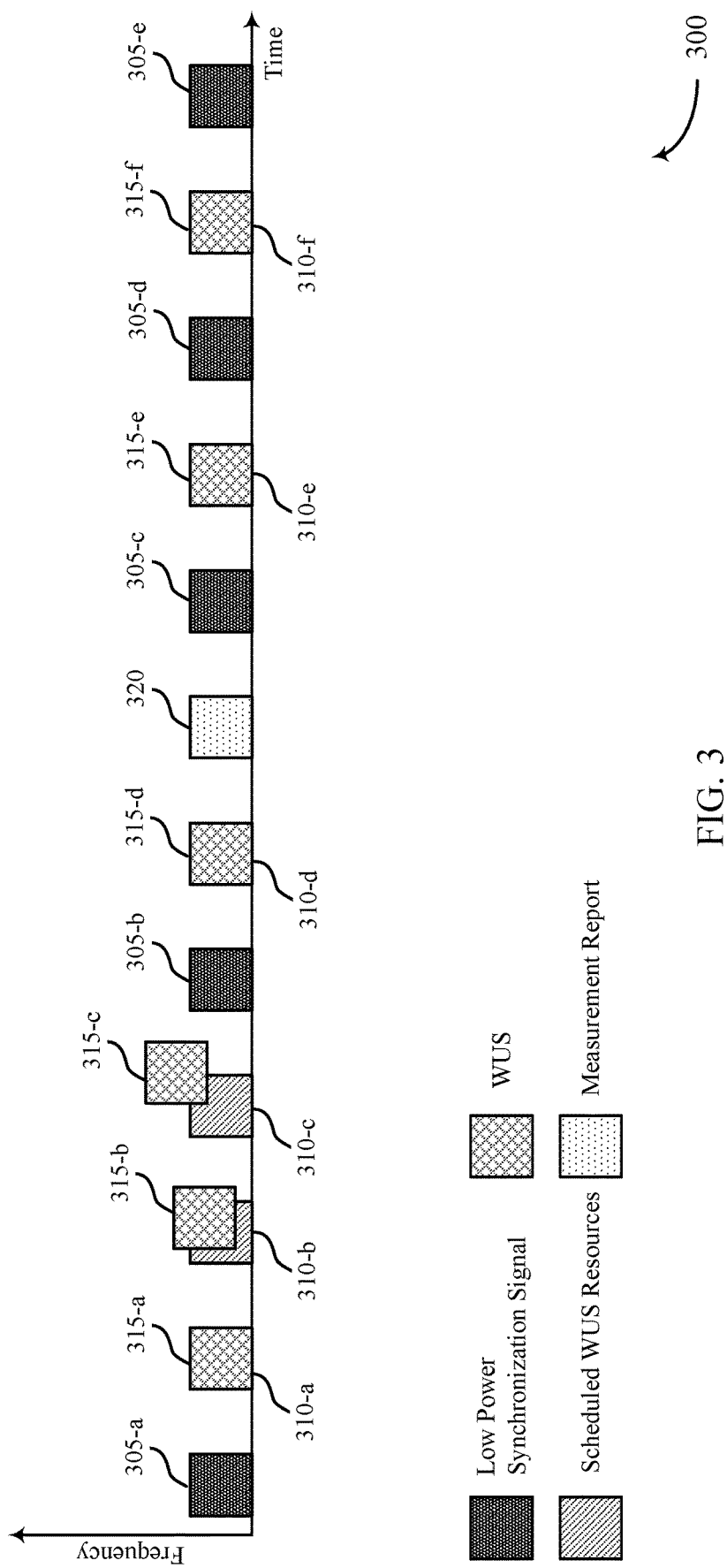
FIG. 3 shows an example of a timing diagram that supports techniques for low power synchronization signal measurements in accordance with one or more aspects of the present disclosure.

FIG. 3 shows an example of a timing diagram 300 that supports techniques for low power synchronization signal measurements in accordance with one or more aspects of the present disclosure. The timing diagram 300 may implement, or be implemented by, aspects of the wireless communications system 100 and the wireless communications system 200. For example, the timing diagrams may be implemented by a UE 115 that includes a low power WUR, which may be an example of a UE 115 as described herein with reference to FIG. 2. Further, the timing diagram 300 may be implemented by a network entity 105, which may be an example of network entities 105 described herein with reference to FIGS. 1 and 2. The timing diagram 300 may implement techniques for the UE 115 to log and report time and frequency offsets for synchronization with the network entity 105.

In some cases, the UE 115 may implement a low power WUR (e.g., such as a low power WUR 210), such that during idle mode operations, the UE may monitor one or more scheduled WUS resources 310 for a WUS 315. In such cases, the UE 115 may not operate the low power WUR in an always-ON operation due to such operations being power inefficient. As such, in order to reduce power consumption, the UE 115 may operate the low power WUR in accordance with a duty cycle (e.g., operate in an active mode for a duration of time and switch to operating in an inactive mode for a duration of time). However, in such cases, the UE 115 and network entity 105 may experience a timing difference between a clock at the network entity 105 and the duty cycle of the low power WUR of the UE 115, which may further lead to a timing mismatch between scheduled WUS resources 310 and WUSs 315. To remedy such time differences, the network entity 105 may transmit a low power synchronization signal 305, such that the UE 115 and the network entity 105 may synchronize both in time and frequency.

In some cases, the network entity 105 may schedule the low power synchronization signals 305 with various periodicities (e.g., such as 160 milliseconds, 320 milliseconds, 640 milliseconds, or the like). Likewise, the network entity 105 may schedule WUS resources 310 with different periodicities. However, in such cases, if the scheduled periodicity of the low power synchronization signals 305 is larger relative to the periodicity of the scheduled WUS resources 310, then the UE 115 may not receive a low power synchronization signal 305 in between the scheduled WUS resources 310, which may lead to a timing drift that affects the WUS 315 detection probability.

For example, the network entity 105 may schedule the low power synchronization signals 305 according to a first periodicity, while the scheduled WUS resources 310 may have a second periodicity that is smaller relative to the first periodicity. As such, the UE 115 may receive the low power synchronization signal 305-*a*, which may enable the UE 115 to synchronize (e.g., match) the time and frequency at which the network entity 105 is operating. Thus, the UE 115 may receive the WUS 315-*a* without any time or frequency offsets (e.g., the scheduled WUS resource 310-*a* is aligned with the WUS 315-*a*).

However, due to the second periodicity of the scheduled WUS resources 310 being smaller relative to the first periodicity of the low power synchronization signals 305, the UE 115 may experience a time and frequency offset (e.g., drift or error) between the scheduled WUS resources 310 and the WUSs 315. For example, the UE 115 may monitor the scheduled WUS resource 310-*b*, but the WUS 315-*b* may be offset from the scheduled WUS resource 310-*b* by a discrete quantity. Further, the UE 115 may experience relatively larger time and frequency offsets as the time between the low power synchronization signals 305 increases, as illustrated in the example of the scheduled WUS resource 310-*c* and the WUS 315-*c*. When the UE 115 receives the low power synchronization signal 305-*b*, the UE 115 may synchronize with the time and frequency of the network entity 105-*a* and receive the WUS 315-*d* according to the scheduled WUS resource 310-*d*. Thus, mechanisms may be desired to assist the network with configuring the periodicity of the low power synchronization signals 305, in order to reduce such time and frequency drifting. Further, it may also be desirable for the network to adjust a transmission power of the low power synchronization signals 305 or the WUSs 315 accordingly.

The techniques described herein may enable the UE 115 to log time offset values and the frequency offset values (e.g., errors or drifts) and report such values to the network entity via a measurement report 320 (e.g., which may be an example of the measurement report 245 as described herein with reference to FIG. 2). For example, in addition to the measurement quantities logged and reported to the network entity 105 (e.g., as described herein with reference to FIG. 2), the UE 115 may also log the accumulated residual time offsets and frequency offsets over a period of time. That is, the UE 115 may log the timing drift and frequency drift over the configured log duration (e.g., periodicity of the low power synchronization signals 305) and report such offsets to the network entity 105 in addition with the measurements of the low power synchronization signals 230 (e.g., MDT measurements). As such, the network may use the time offset values and the frequency offset values to adjust the periodicity, transmit power, or both of the low power synchronization signals 305 and the scheduled WUS resources 310.

As an illustrative example, the UE 115 may log the time offset values and the frequency offset values of the WUSs 315 over the time period between the low power synchronization signal 305-a and the low power synchronization signal 305-b. That is, the UE 115 may log a first time offset value and a first frequency offset value between the scheduled WUS resource 310-a and the WUS 315-a in a memory of the UE 115. Likewise, the UE 115 may log a second time offset value and a second frequency offset value between the scheduled WUS resource 310-b and the WUS 315-b and a third time offset value and a third frequency offset value between the scheduled WUS resource 310-c and the WUS 315-c. As such, the UE may report such time offset values and frequency offset values to the network entity 105 via the measurement report 320, where the measurement report 320 may also include measurements of the low power synchronization signal 305-a and the low power synchronization signal 305-c.

The network entity 105 may use such time offset values and frequency offset values to adjust the periodicity, transmission power, or both of the low power synchronization signal 305, the scheduled WUS resources 310, or both. For example, the network entity 105 may set the periodicities of both the low power synchronization signal 305 and the scheduled WUS resources 310 such that the UE may receive a low power synchronization signal 305 (e.g., a low power synchronization signal 305-c, a low power synchronization signal 305-d, and a low power synchronization signal 305-c) prior to the scheduled WUS resource 310 (e.g., scheduled WUS resource 310-e and scheduled WUS resource 310-f), thereby enabling the UE 115 to receive the WUSs 315 (e.g., WUS 315-c and WUS 315-f) without time and frequency drifts.

In some examples, the UE 115 may include the time offset values and the frequency offset values in the measurement report 320 based on first control information (e.g., a reporting configuration) received from the network entity 105. Such first control information may be an example of the first control information 235 as described herein with reference to FIG. 2. That is, the network entity 105 may indicate, via the first control information, whether to report the time offset values and the frequency offset values in addition to the measurements of the low power synchronization signal 305 via the measurement report 320. For example, the network entity 105 may enable or disable the reporting of the time offset values and the frequency offset values via the first control information, or indicate to transmit the measurements of the low power synchronization signals 305, without the time offset values and the frequency offset values.

In some other examples, the UE 115 may include the time offset values and the frequency offset values in the measurement report 320 based on whether the time offset values and the frequency offset values satisfy a time offset threshold and a frequency offset threshold, respectively, (e.g., respective offset thresholds X) over a threshold quantity of samples (e.g., over Y samples). The time offset threshold, the frequency offset threshold, and the threshold quantity of samples may be configured by the network entity 105 via first control information or predefined in a standard. Additionally, or alternatively, the thresholds may be defined based on the highest support periodicity of the low power synchronization signals 305.

As an illustrative example, the time offset threshold may be configured to 5 milliseconds while the frequency offset threshold may be configured to 2 kilohertz. Thus, if the UE 115 detects that a time offset value between the scheduled WUS resource 310-c and the WUS 315-c is greater than 5 milliseconds, then the UE 115 may report the logged time offset values and frequency offset values. Similarly, if the UE 115 detects that a frequency offset value between the scheduled WUS resource 310-c and the WUS 315-c is greater than 2 kilohertz, then the UE 115 may report the logged time offset values and frequency offset values. In this way, the UE 115 may report such time and frequency offset values based on threshold values.

In some other examples, the UE 115 may include the time offset values and the frequency offset values in the measurement report 320 based on a capability of the UE to log and report such values. Such capability reporting may be included in the capability message 240, as described herein with reference to FIG. 2. As an illustrative example, if the UE 115 is a relatively low end or low cost device, then the UE 115-a may not be able to support such reporting mechanisms. Alternatively, if the UE 115 is a mid-tier device, then the UE 115-a may support reporting of a limited set of values and types. If the UE 115-a is a high end device, then the UE 115-a may support reporting of each measurement value and type. The UE 115 may indicate such capabilities to the network entity 105, where the network entity 105 may indicate whether the UE is to report the time the frequency and the frequency offset values.

In this way, the UE 115 may provide the network entity 105 with indications of both measurements of low power synchronization signals 305 and time offset values and frequency offset values while the UE is operating in the idle mode. As such, the network entity 105 adjust the periodicity of the scheduled WUS resources, low power synchronization signals, or both, thereby leading to improved coordination between devices and a more efficient utilization of communication resources.

Figure 4:
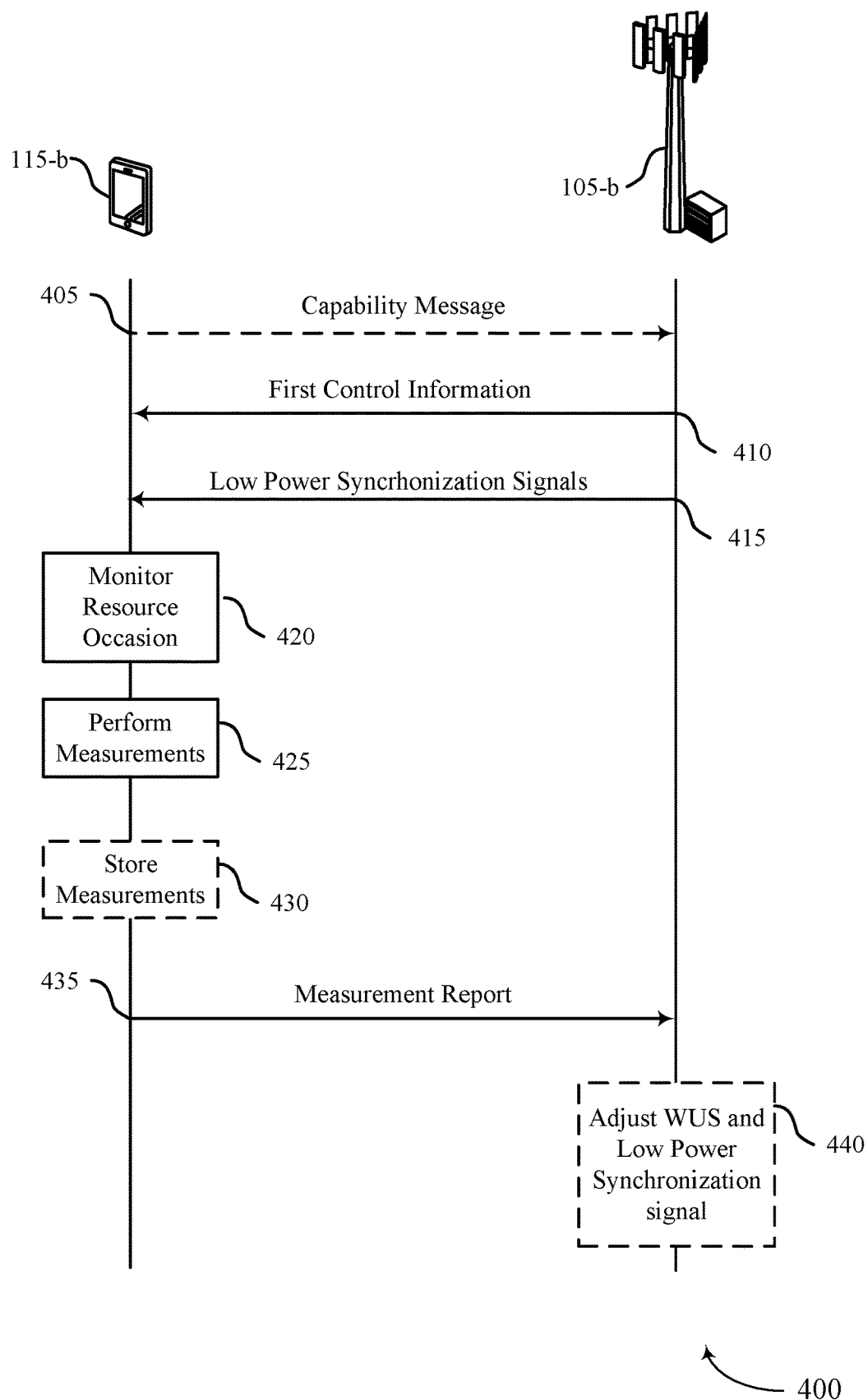
FIG. 4 shows an example of a process flow that supports techniques for low power synchronization signal measurements in accordance with one or more aspects of the present disclosure.

FIG. 4 shows an example of a process flow 400 that supports techniques for low power synchronization signal measurements in accordance with one or more aspects of the present disclosure. The process flow 400 may implement, or be implemented by, aspects of the wireless communications system 100, the wireless communications system 200, and the timing diagram 300. For example, the process flow 400 may include a UE 115-b and a network entity 105-b, which may be examples of corresponding devices and described herein with reference to FIGS. 1 through 3.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time. The process flow 400 may implement techniques for reporting MDT measurements, time offset values, and frequency offset values associated with low power synchronization signals as described herein with reference to FIGS. 2 and 3.

At 405, the UE 115-b may transmit a capability message (e.g., such as a capability message 240) indicating whether the UE supports performing measurements of low power synchronization signals (e.g., such as the low power synchronization signals 230 and the low power synchronization signals 305). For example, the UE 115-b may indicate whether the UE 115-b includes a low power WUR, supports reporting a filtered set of measurements, supports reporting a down-sampled set of measurements (e.g., subset of measurements), supports reporting time offset values and frequency offset values, among other capabilities as described herein with reference to FIGS. 2 and 3. The UE 115-*b* may transmit the capability message while operating in an active mode.

At 410, the network entity 105-*b* may transmit first control information (e.g., such as first control information 235) associated with the low power synchronization signals. The low power synchronization signals may be associated with a low power WUR of the UE 115-*b*. The first control information may indicate a periodicity of the low power synchronization signals, types of measurements to perform and report, whether the UE 115-*b* is to report all logged measurements, a filtered set of measurements, down-sampled set of measurements, or statistical values of the measurements, as described herein with reference to FIG. 2. Further, the first control information may indicate whether the UE 115-*b* is to log and report time offset values and frequency offset values in addition to the measurements as described herein with reference to FIG. 3. The UE 115-*b* receive the first control information while operating in the active mode.

At 415, the network entity 105-*b* may transmit the low power synchronization signals in accordance with the first control information. That is, the network entity 105-*b* may transmit, according to the indicated periodicity, the synchronization signals. At 420, the UE 115-*b* may monitor the resource occasions of the synchronization signals in accordance with the periodicity indicated in the first control information. In such examples, the UE 115-*b* may use a low power WUR of the UE to monitor for, and receive, the low power synchronization signals. The UE 115-*b* may monitor for the low power synchronization signals while operating in either the active or idle modes.

At 425, the UE 115-*b* may perform, using the low power WUR, the measurements of the synchronization signals in accordance with the first control information. The UE 115-*b* may perform such measurements as described herein with reference to FIG. 2. Further, the UE 115-*b* may also identify one or more time offset values and frequency offset values of WUSs and the low power synchronization signals as described herein with reference to FIG. 3. The UE 115-*b* may perform the measurements while operating in either the active or idle modes.

At 430, the UE 115-*b* may log (e.g., store or write to memory) the measurements of the low power synchronization signals, the time offset values, and the frequency offset values in a memory buffer of the UE 115-*b*.

At 435, the UE 115-*b* may transmit a report (e.g., such as the measurement report 245 and the measurement report 320) that includes at least the measurements of the low power synchronization signals. In some examples, the UE 115-*b* may report a filtered set of measurements, a down-sampled set of measurements, or statistical values of the measurements as described herein with reference to FIG. 2. Additionally, or alternatively, the UE 115-*b* may also report the time offset values and the frequency offset values as described herein with reference to FIG. 3.

At 440, the network entity 105-*b* may adjust a periodicity of a low power WUS, a periodicity of the low power synchronization signals, a transmit power of the low power WUS, or a transmit power of the low power synchronization signal based on the time offset value and the frequency offset value. That is, if the UE 115-*b* reports the time offset values and the frequency offset values, the network entity 105-*b* may adjust the periodicity, transmit power, or both of the low power synchronization signal and WUSs as described herein with reference to FIG. 3.

Figure 5:
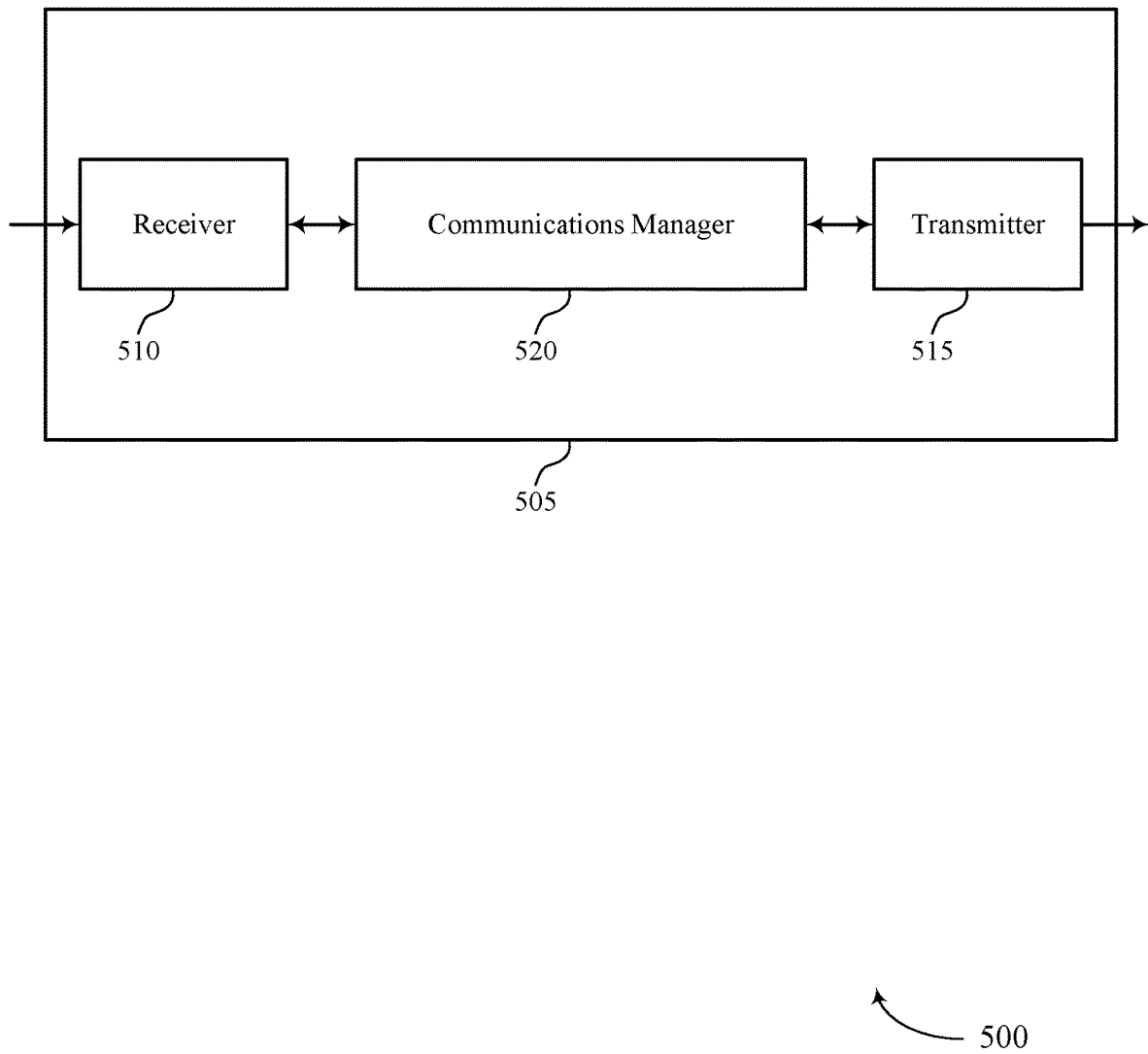
FIGS. 5 and 6 show block diagrams of devices that support techniques for low power synchronization signal measurements in accordance with one or more aspects of the present disclosure.

FIG. 5 shows a block diagram 500 of a device 505 that supports techniques for low power synchronization signal measurements in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for low power synchronization signal measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for low power synchronization signal measurements). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for low power synchronization signal measurements as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving first control information associated with a low power synchronization signal, the low power synchronization signal being associated with a first radio of the UE. The communications manager 520 is capable of, configured to, or operable to support a means for monitoring, using the first radio, a resource occasion for the low power synchronization signal in accordance with the first control information. The communications manager 520 is capable of, configured to, or operable to support a means for performing, using the first radio, measurements of the low power synchronization signal based on the monitoring, the performance of the measurements being in accordance with the first control information. The communications manager 520 is capable of, configured to, or operable to support a means for transmitting a report including the measurements of the low power synchronization signal based on the performed measurements.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for performing MDT measurements using a low power WUR and a low power synchronization signal, which may result in reduced power consumption, more efficient utilization of communication resources, and increased coordination between devices.

Figure 6:
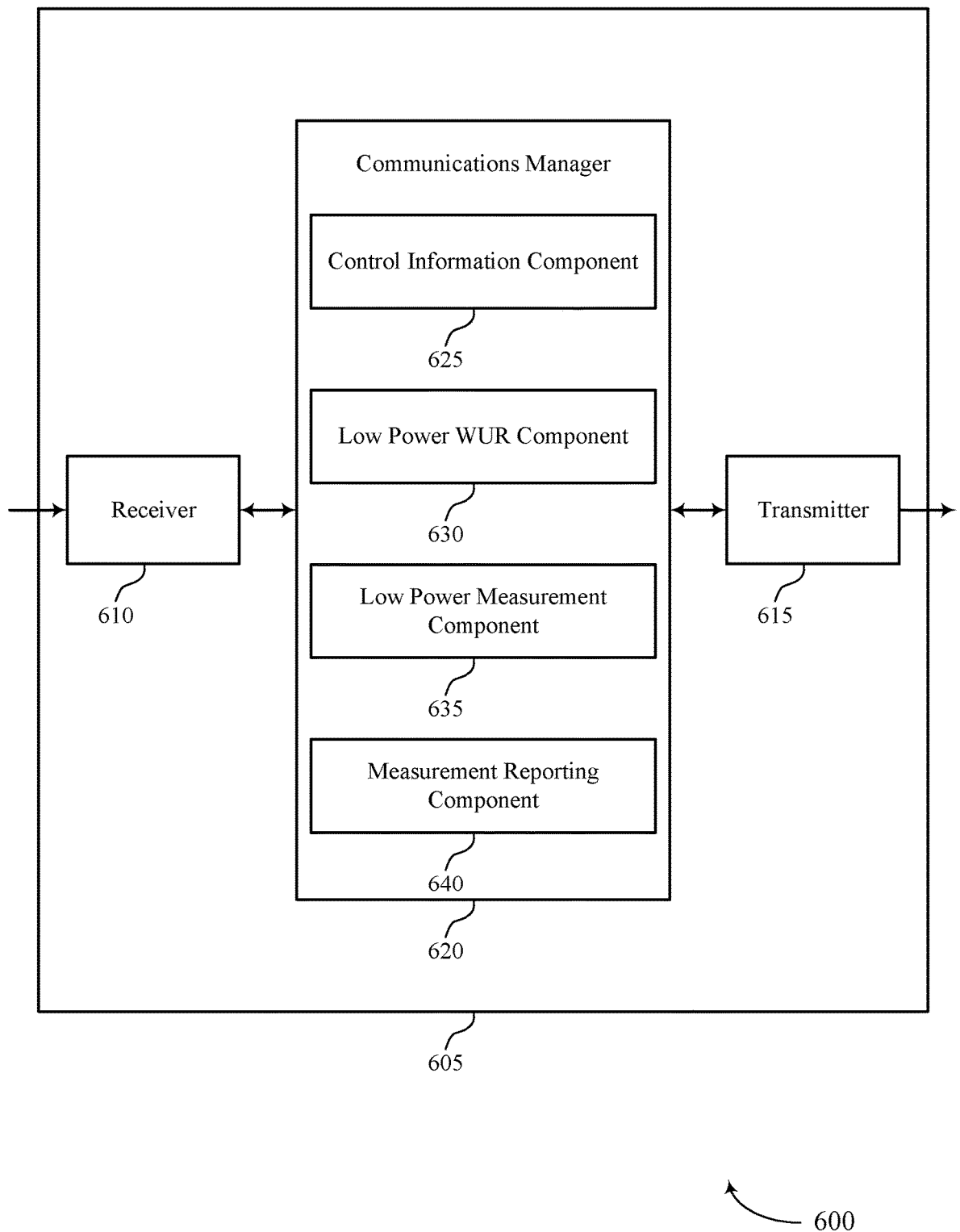

FIG. 6 shows a block diagram 600 of a device 605 that supports techniques for low power synchronization signal measurements in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for low power synchronization signal measurements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for low power synchronization signal measurements). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for low power synchronization signal measurements as described herein. For example, the communications manager 620 may include a control information component 625, a low power WUR component 630, a low power measurement component 635, a measurement reporting component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The control information component 625 is capable of, configured to, or operable to support a means for receiving first control information associated with a low power synchronization signal, the low power synchronization signal being associated with a first radio of the UE. The low power WUR component 630 is capable of, configured to, or operable to support a means for monitoring, using the first radio, a resource occasion for the low power synchronization signal in accordance with the first control information. The low power measurement component 635 is capable of, configured to, or operable to support a means for performing, using the first radio, measurements of the low power synchronization signal based on the monitoring, the performance of the measurements being in accordance with the first control information. The measurement reporting component 640 is capable of, configured to, or operable to support a means for transmitting a report including the measurements of the low power synchronization signal based on the performed measurements.

Figure 7:
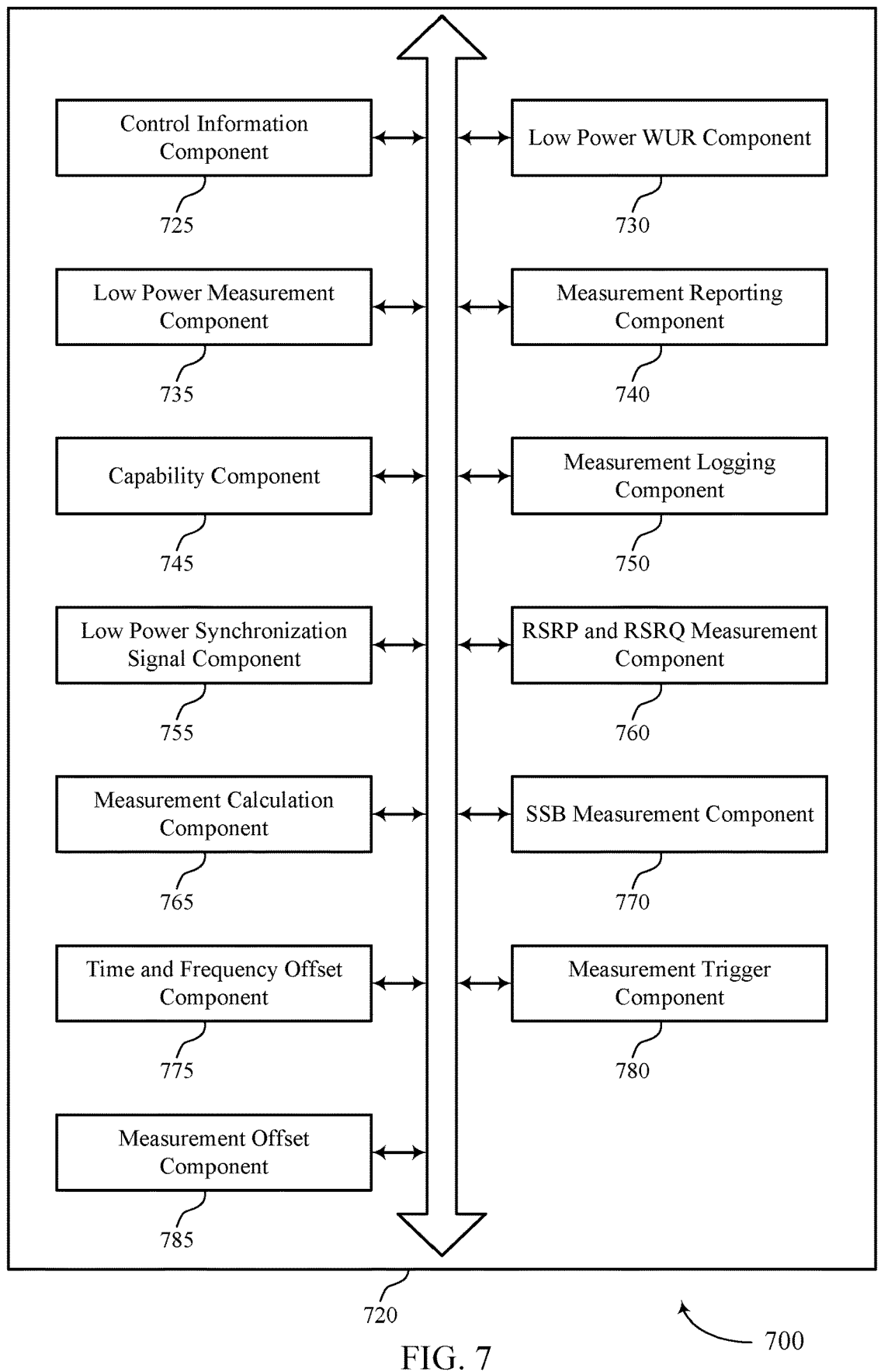
FIG. 7 shows a block diagram of a communications manager that supports techniques for low power synchronization signal measurements in accordance with one or more aspects of the present disclosure.

FIG. 7 shows a block diagram 700 of a communications manager 720 that supports techniques for low power synchronization signal measurements in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for low power synchronization signal measurements as described herein. For example, the communications manager 720 may include a control information component 725, a low power WUR component 730, a low power measurement component 735, a measurement reporting component 740, a capability component 745, a measurement logging component 750, a low power synchronization signal component 755, an RSRP and RSRQ measurement component 760, a measurement calculation component 765, an SSB measurement component 770, a time and frequency offset component 775, a measurement trigger component 780, a measurement offset component 785, or any combination thereof. Each of these components may communicate, directly or indirectly, with one another (e.g., via one or more buses).

The communications manager 720 may support wireless communications at a UE in accordance with examples as disclosed herein. The control information component 725 is capable of, configured to, or operable to support a means for receiving first control information associated with a low power synchronization signal, the low power synchronization signal being associated with a first radio of the UE. The low power WUR component 730 is capable of, configured to, or operable to support a means for monitoring, using the first radio, a resource occasion for the low power synchronization signal in accordance with the first control information. The low power measurement component 735 is capable of, configured to, or operable to support a means for performing, using the first radio, measurements of the low power synchronization signal based on the monitoring, the performance of the measurements being in accordance with the first control information. The measurement reporting component 740 is capable of, configured to, or operable to support a means for transmitting a report including the measurements of the low power synchronization signal based on the performed measurements.

In some examples, the capability component 745 is capable of, configured to, or operable to support a means for transmitting a capability message indicating whether the UE supports performing the measurements of the low power synchronization signal, where receiving the first control information is based on the capability message.

In some examples, the capability message further indicates whether the UE supports reporting a subset of the measurements, a filtered set of measurements, or both. In some examples, transmitting the report including the measurements is based on the capability message.

In some examples, the measurement logging component 750 is capable of, configured to, or operable to support a means for storing the measurements of the low power synchronization signal and a time stamp associated with the measurements of the low power synchronization signal based on performing the measurements, where transmitting the report including the measurements is based on the storing.

In some examples, the low power synchronization signal component 755 is capable of, configured to, or operable to support a means for receiving, as part of the first control information, an indication of a periodicity of the low power synchronization signal, where monitoring the resource occasion for the low power synchronization signal is in accordance with the periodicity.

In some examples, the RSRP and RSRQ measurement component 760 is capable of, configured to, or operable to support a means for receiving, as part of the first control information, an indication to measure a power of the low power synchronization signal or a quality of the low power synchronization signal, where performing the measurements is in accordance with the first control information.

In some examples, the measurement calculation component 765 is capable of, configured to, or operable to support a means for receiving, as part of the first control information, an indication to report a filtered set of the measurements, a down-sampled set of the measurements, or one or more statistical values of the measurements, where transmitting the report is in accordance with the first control information.

In some examples, the measurement reporting component 740 is capable of, configured to, or operable to support a means for transmitting, as part of the report, an indication that the measurements of the low power synchronization signal were performed by the first radio, the first radio being a low power wake-up radio of the UE.

In some examples, the SSB measurement component 770 is capable of, configured to, or operable to support a means for transmitting, as part of the report, measurements of a synchronization signal block received at the UE using a second radio, the second radio being a main radio of the UE, where the measurements of the low power synchronization signal are modified in accordance with a set of offsets.

In some examples, the measurement offset component 785 is capable of, configured to, or operable to support a means for receiving second control information indicating the set of offsets for the measurements of the low power synchronization signal, where transmitting the report with both the measurements of the synchronization signal block and the measurements of the low power synchronization signal is based on receiving the second control information.

In some examples, the time and frequency offset component 775 is capable of, configured to, or operable to support a means for transmitting, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

In some examples, the time and frequency offset component 775 is capable of, configured to, or operable to support a means for receiving, as part of the first control information, an indication to include the time offset value and the frequency offset value in the report, where transmitting the time offset value and the frequency offset value is based on the first control information.

In some examples, transmitting the time offset value and the frequency offset value is based on the time offset value satisfying a time error threshold or the frequency offset value satisfying a frequency error threshold.

In some examples, transmitting the time offset value and the frequency offset value is based on a capability of the UE to support performing the measurements of the low power synchronization signal.

In some examples, the measurement trigger component 780 is capable of, configured to, or operable to support a means for receiving a message indicating for the UE to report the measurements of the low power synchronization signal, where transmitting the report is based on receiving the message.

In some examples, the first control information further indicates to transmit the report while the UE is operating in one of an inactive mode or a connected mode.

In some examples, the first control information further indicates a periodicity associated with transmitting the report. In some examples, transmitting the report is in accordance with the periodicity.

In some examples, the first control information further indicates to transmit the report using one of the first radio of the UE or a second radio of the UE, the first radio being a low power wake-up radio and the second radio being a main radio of the UE.

Figure 8:
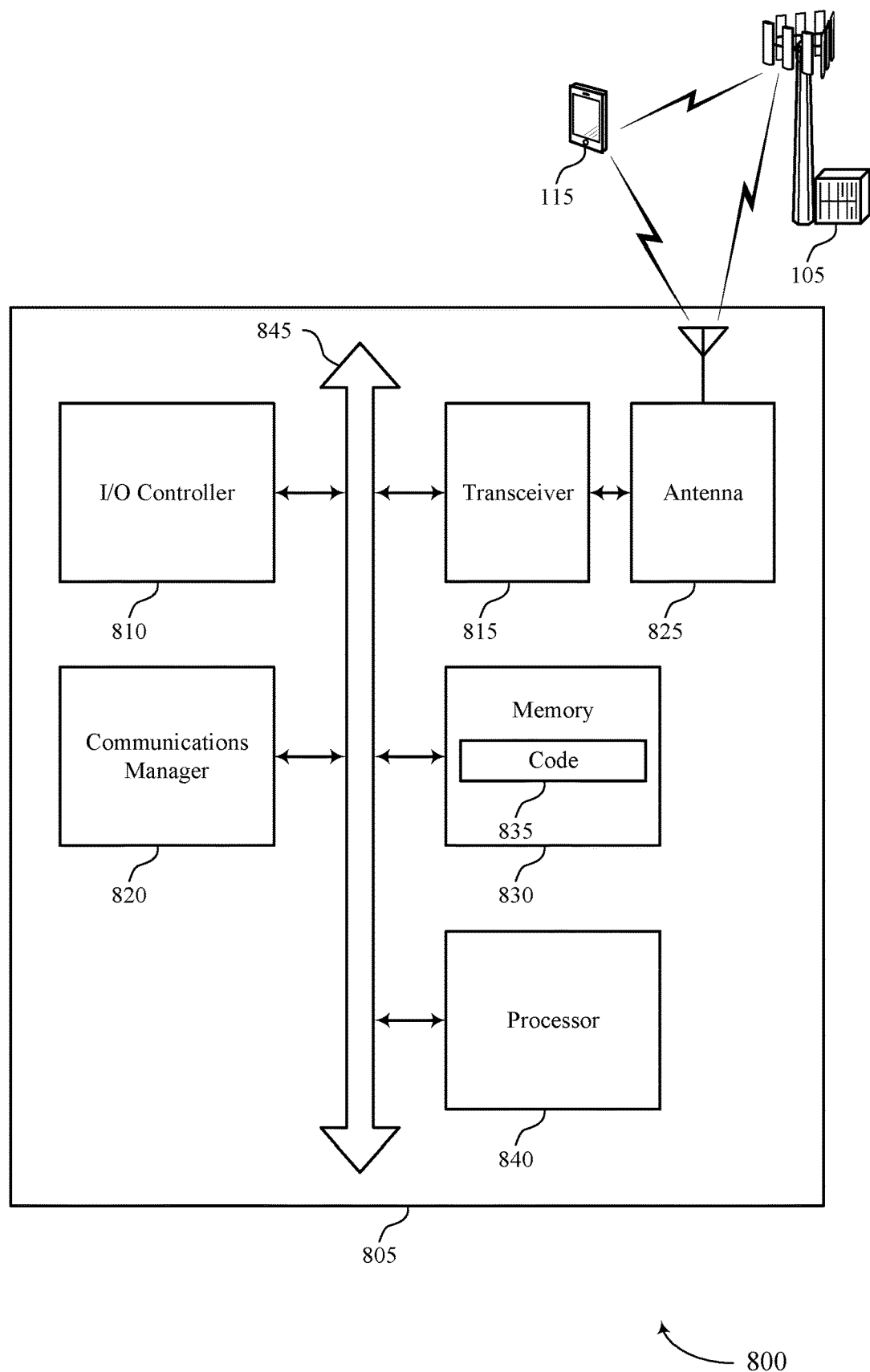
FIG. 8 shows a diagram of a system including a device that supports techniques for low power synchronization signal measurements in accordance with one or more aspects of the present disclosure.

FIG. 8 shows a diagram of a system 800 including a device 805 that supports techniques for low power synchronization signal measurements in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for low power synchronization signal measurements). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving first control information associated with a low power synchronization signal, the low power synchronization signal being associated with a first radio of the UE. The communications manager 820 is capable of, configured to, or operable to support a means for monitoring, using the first radio, a resource occasion for the low power synchronization signal in accordance with the first control information. The communications manager 820 is capable of, configured to, or operable to support a means for performing, using the first radio, measurements of the low power synchronization signal based on the monitoring, the performance of the measurements being in accordance with the first control information. The communications manager 820 is capable of, configured to, or operable to support a means for transmitting a report including the measurements of the low power synchronization signal based on the performed measurements.

By including or configuring the communications manager 820 in accordance with examples as described herein, the device 805 may support techniques for performing MDT measurements on a low power synchronization signal using a low power WUR, which may result in improved communication reliability, reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for low power synchronization signal measurements as described herein, or the processor 840 and the memory 830 may be otherwise configured to perform or support such operations. In some examples, the memory 830 may be configured to store measurements of the low power synchronization signal.

Figure 9:
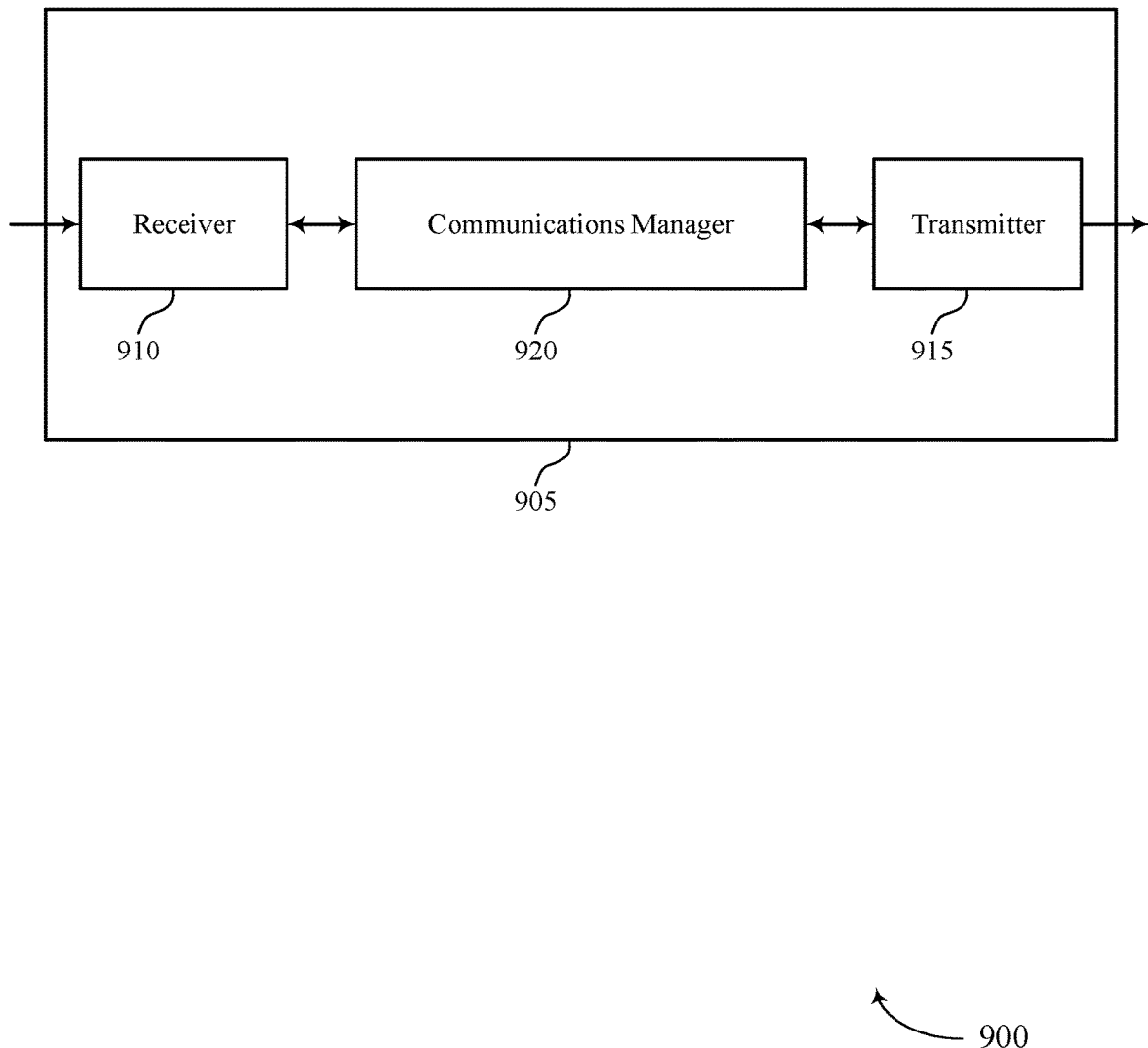
FIGS. 9 and 10 show block diagrams of devices that support techniques for low power synchronization signal measurements in accordance with one or more aspects of the present disclosure.

FIG. 9 shows a block diagram 900 of a device 905 that supports techniques for low power synchronization signal measurements in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for low power synchronization signal measurements as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting first control information associated with a low power synchronization signal, the low power synchronization signal being associated with a first radio of a UE. The communications manager 920 is capable of, configured to, or operable to support a means for transmitting, via a resource occasion, the low power synchronization signal in accordance with the first control information. The communications manager 920 is capable of, configured to, or operable to support a means for receiving a report including measurements of the low power synchronization signal based on transmitting the low power synchronization signal.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for performing MDT measurements on a low power synchronization signal using a low power WUR, which may result in reduced power consumption and more efficient utilization of communication resources.

Figure 10:
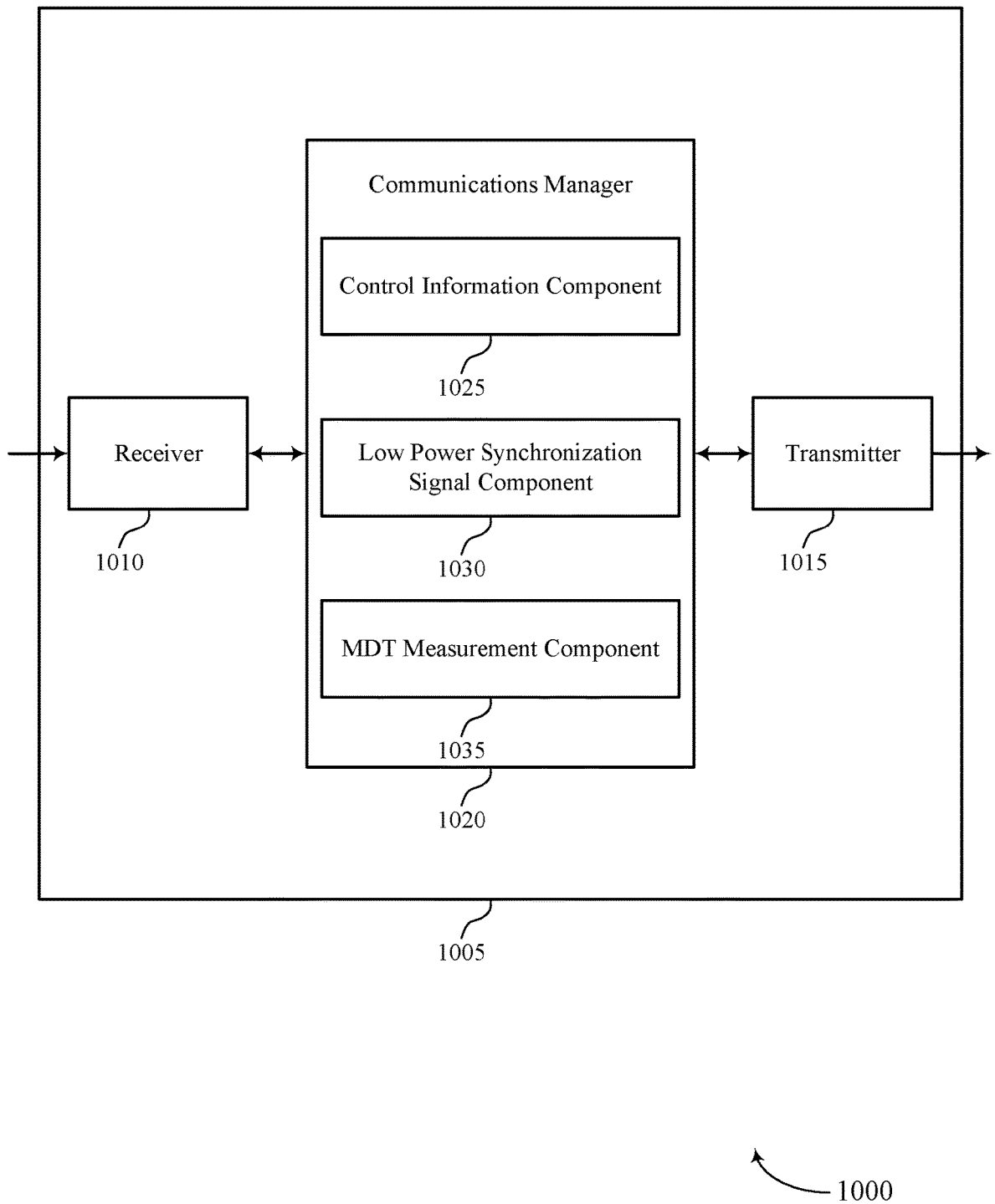

FIG. 10 shows a block diagram 1000 of a device 1005 that supports techniques for low power synchronization signal measurements in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for low power synchronization signal measurements as described herein. For example, the communications manager 1020 may include a control information component 1025, a low power synchronization signal component 1030, an MDT measurement component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The control information component 1025 is capable of, configured to, or operable to support a means for transmitting first control information associated with a low power synchronization signal, the low power synchronization signal being associated with a first radio of a UE. The low power synchronization signal component 1030 is capable of, configured to, or operable to support a means for transmitting, via a resource occasion, the low power synchronization signal in accordance with the first control information. The MDT measurement component 1035 is capable of, configured to, or operable to support a means for receiving a report including measurements of the low power synchronization signal based on transmitting the low power synchronization signal.

Figure 11:
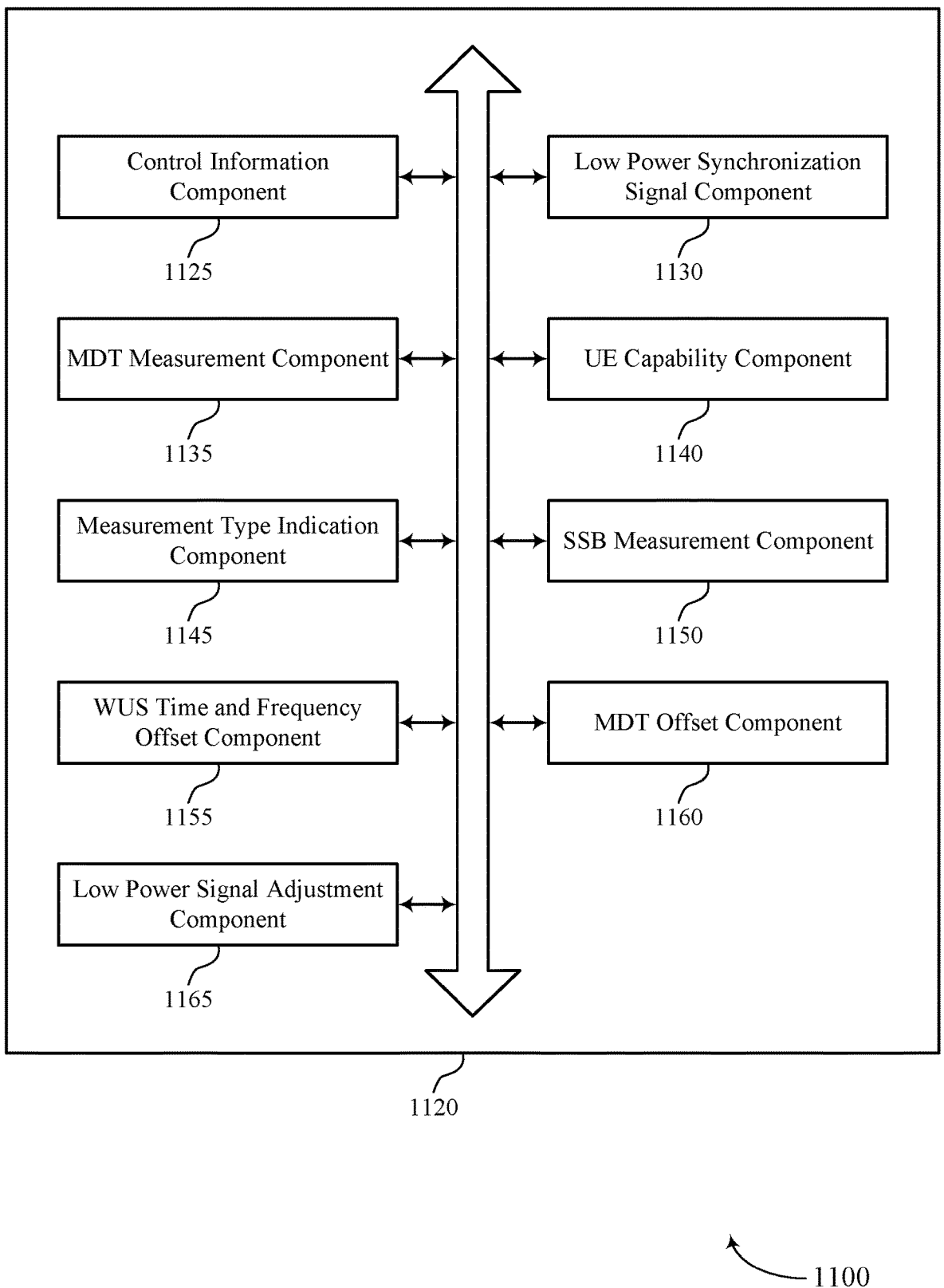
FIG. 11 shows a block diagram of a communications manager that supports techniques for low power synchronization signal measurements in accordance with one or more aspects of the present disclosure.

FIG. 11 shows a block diagram 1100 of a communications manager 1120 that supports techniques for low power synchronization signal measurements in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for low power synchronization signal measurements as described herein. For example, the communications manager 1120 may include a control information component 1125, a low power synchronization signal component 1130, an MDT measurement component 1135, a UE capability component 1140, a measurement type indication component 1145, an SSB measurement component 1150, a WUS time and frequency offset component 1155, an MDT offset component 1160, a low power signal adjustment component 1165, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The control information component 1125 is capable of, configured to, or operable to support a means for transmitting first control information associated with a low power synchronization signal, the low power synchronization signal being associated with a first radio of a UE. The low power synchronization signal component 1130 is capable of, configured to, or operable to support a means for transmitting, via a resource occasion, the low power synchronization signal in accordance with the first control information. The MDT measurement component 1135 is capable of, configured to, or operable to support a means for receiving a report including measurements of the low power synchronization signal based on transmitting the low power synchronization signal.

In some examples, the UE capability component 1140 is capable of, configured to, or operable to support a means for receiving a capability message indicating whether the UE supports performing the measurements of the low power synchronization signal, where transmitting the first control information is based on the capability message.

In some examples, the capability message further indicates whether the UE supports reporting a subset of the measurements, a filtered set of measurements, or both. In some examples, the measurements in the report are based on the capability message.

In some examples, the low power synchronization signal component 1130 is capable of, configured to, or operable to support a means for transmitting, as part of the first control information, an indication of a periodicity of the low power synchronization signal, where transmitting the low power synchronization signal is in accordance with the periodicity.

In some examples, the measurement type indication component 1145 is capable of, configured to, or operable to support a means for transmitting, as part of the first control information, an indication for the UE to measure a power of the low power synchronization signal or a quality of the low power synchronization signal, where performing the measurements is in accordance with the first control information.

In some examples, the measurement type indication component 1145 is capable of, configured to, or operable to support a means for transmitting, as part of the first control information, an indication to report a filtered set of the measurements, a down-sampled set of the measurements, or one or more statistical values of the measurements, where transmitting the report is in accordance with the first control information.

In some examples, the MDT measurement component 1135 is capable of, configured to, or operable to support a means for receiving, as part of the report, an indication that the measurements of the low power synchronization signal were performed by the first radio of the UE, the first radio being a low power wake-up radio of the UE.

In some examples, the SSB measurement component 1150 is capable of, configured to, or operable to support a means for receiving, as part of the report, measurements of a synchronization signal block received at the UE using a second radio, the second radio being a main radio of the UE, where the measurements of the low power synchronization signal are modified in accordance with a set of offsets.

In some examples, the MDT offset component 1160 is capable of, configured to, or operable to support a means for transmitting second control information indicating the set of offsets for the measurements of the low power synchronization signal, where receiving the report that includes both the measurements of the synchronization signal block and the measurements of the low power synchronization signal is based on transmitting the second control information.

In some examples, the WUS time and frequency offset component 1155 is capable of, configured to, or operable to support a means for receiving, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

In some examples, the WUS time and frequency offset component 1155 is capable of, configured to, or operable to support a means for transmitting, as part of the first control information, an indication to include the time offset value and the frequency offset value in the report, where receiving the time offset value and the frequency offset value is based on the first control information.

In some examples, the low power signal adjustment component 1165 is capable of, configured to, or operable to support a means for adjusting a periodicity of a low power wake-up signal, a periodicity of the low power synchronization signal, a transmit power of the low power wake-up signal, or a transmit power of the low power synchronization signal based on the time offset value and the frequency offset value.

In some examples, receiving the time offset value and the frequency offset value is based on the time offset value satisfying a time error threshold or the frequency offset value satisfying a frequency error threshold.

In some examples, receiving the time offset value and the frequency offset value is based on a capability of the UE to support performing the measurements of the low power synchronization signal.

In some examples, the MDT measurement component 1135 is capable of, configured to, or operable to support a means for transmitting a message indicating for the UE to report the measurements of the low power synchronization signal, where transmitting the report is based on receiving the message.

In some examples, the first control information further indicates to transmit the report while the UE is operating in one of an inactive mode or a connected mode.

In some examples, the first control information further indicates a periodicity associated with the report. In some examples, receiving the report is in accordance with the periodicity.

In some examples, the first control information further indicates for the UE to transmit the report using one of the first radio of the UE or a second radio of the UE, the first radio being a low power wake-up radio and the second radio being a main radio of the UE.

Figure 12:
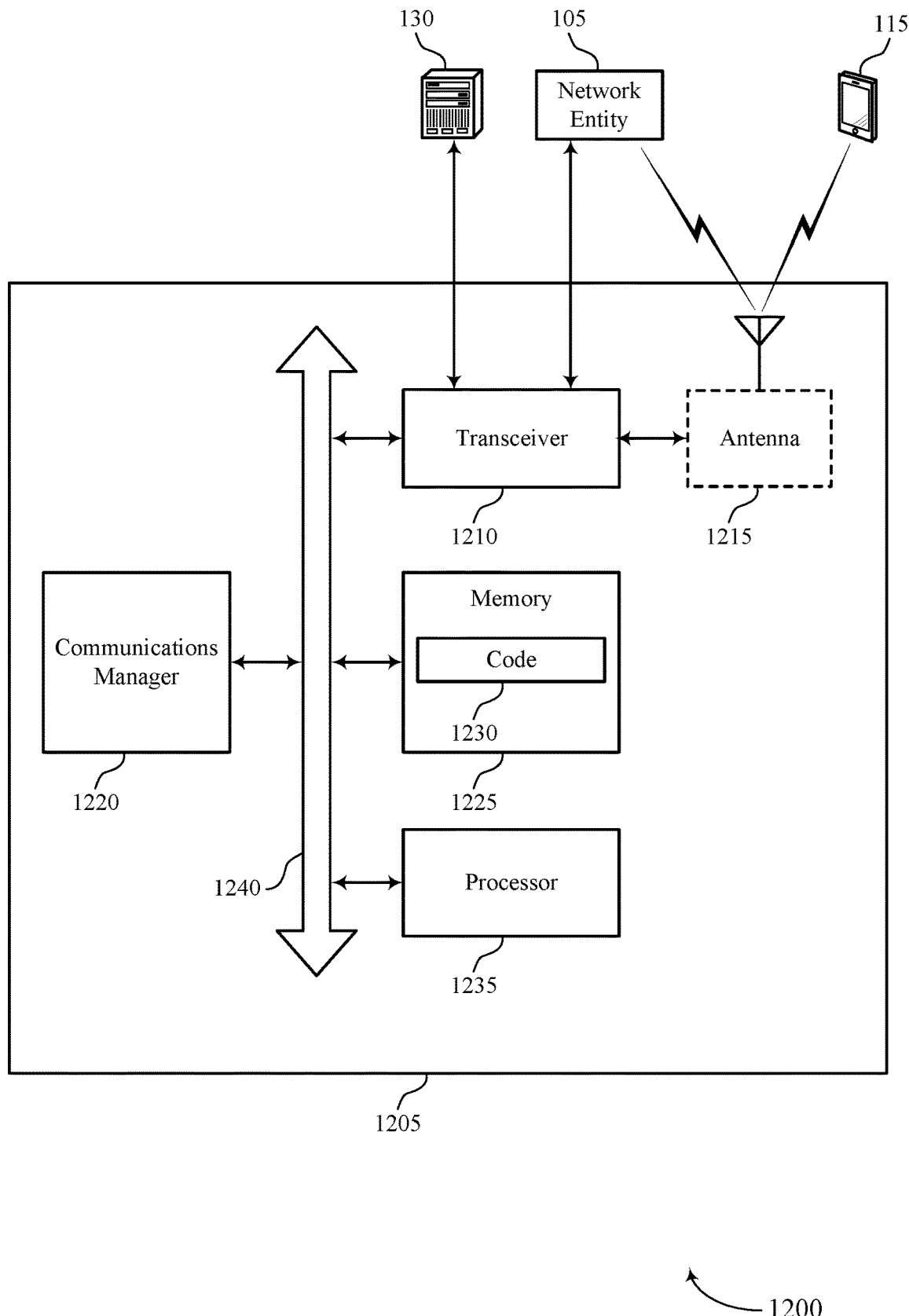
FIG. 12 shows a diagram of a system including a device that supports techniques for low power synchronization signal measurements in accordance with one or more aspects of the present disclosure.

FIG. 12 shows a diagram of a system 1200 including a device 1205 that supports techniques for low power synchronization signal measurements in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for low power synchronization signal measurements). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting first control information associated with a low power synchronization signal, the low power synchronization signal being associated with a first radio of a UE. The communications manager 1220 is capable of, configured to, or operable to support a means for transmitting, via a resource occasion, the low power synchronization signal in accordance with the first control information. The communications manager 1220 is capable of, configured to, or operable to support a means for receiving a report including measurements of the low power synchronization signal based on transmitting the low power synchronization signal.

By including or configuring the communications manager 1220 in accordance with examples as described herein, the device 1205 may support techniques for performing MDT measurements on a low power synchronization signal using a low power WUR, which may result in improved communication reliability, reduced power consumption, more efficient utilization of communication resources, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for low power synchronization signal measurements as described herein, or the processor 1235 and the memory 1225 may be otherwise configured to perform or support such operations.

Figure 13:
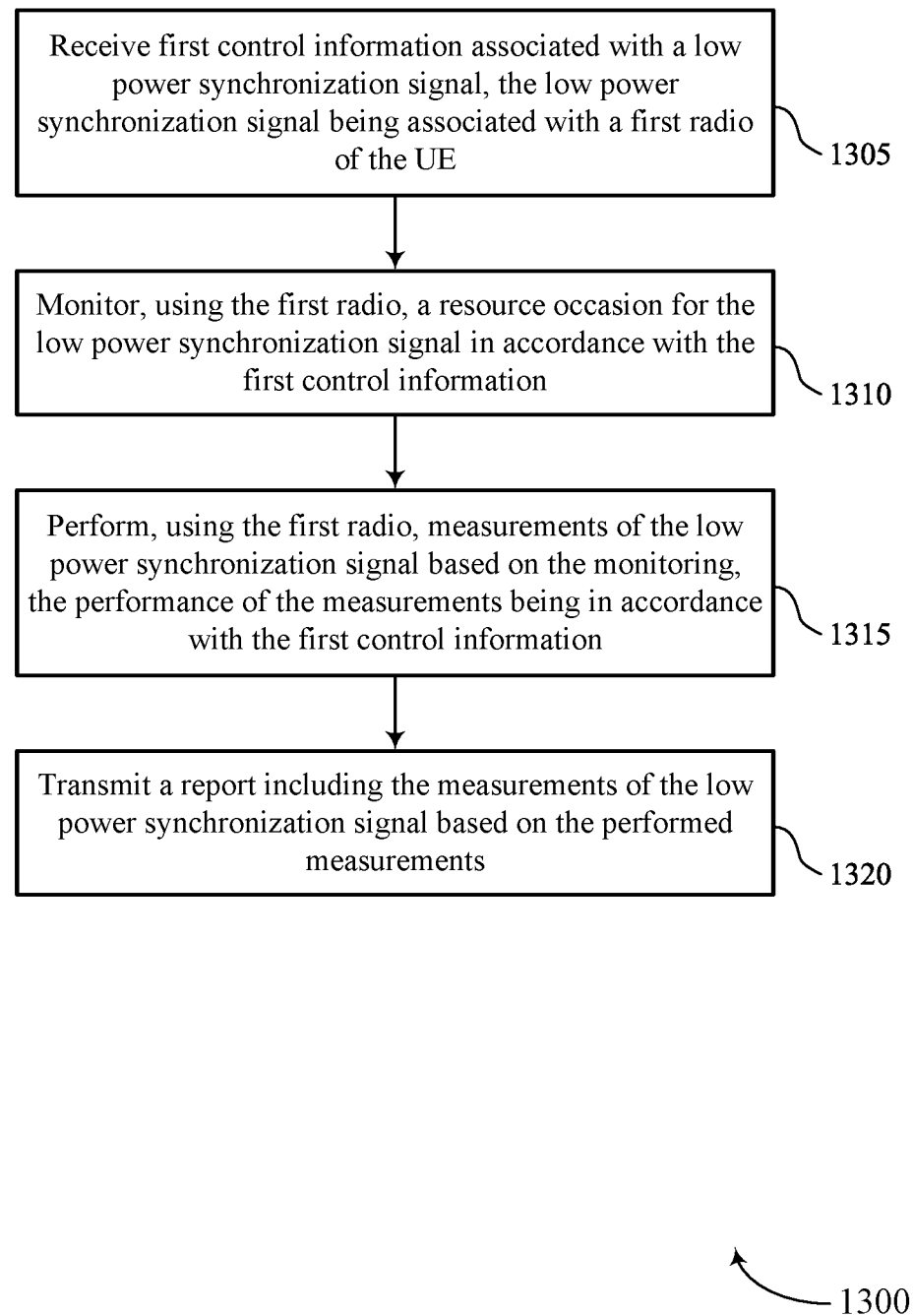
FIGS. 13 through 16 show flowcharts illustrating methods that support techniques for low power synchronization signal measurements in accordance with one or more aspects of the present disclosure.

FIG. 13 shows a flowchart illustrating a method 1300 that supports techniques for low power synchronization signal measurements in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving first control information associated with a low power synchronization signal, the low power synchronization signal being associated with a first radio of the UE. The operations of 1305 may be performed in accordance with examples as disclosed herein. In some examples, aspects of the operations of 1305 may be performed by a control information component 725 as described with reference to FIG. 7.

At 1310, the method may include monitoring, using the first radio, a resource occasion for the low power synchronization signal in accordance with the first control information. The operations of 1310 may be performed in accordance with examples as disclosed herein. In some examples, aspects of the operations of 1310 may be performed by a low power WUR component 730 as described with reference to FIG. 7.

At 1315, the method may include performing, using the first radio, measurements of the low power synchronization signal based on the monitoring, the performance of the measurements being in accordance with the first control information. The method may also include storing the measurements of the low power synchronization signal and a time stamp associated with the measurements of the low power synchronization signal based at least in part on performing the measurements. The operations of 1315 may be performed in accordance with examples as disclosed herein. In some examples, aspects of the operations of 1315 may be performed by a low power measurement component 735 as described with reference to FIG. 7. Further, in some examples, the measurements may be stored by a measurement logging component 750 in a memory 830 of the UE as described herein with reference to FIGS. 7 and 8.

At 1320, the method may include transmitting a report including the measurements of the low power synchronization signal based on the performed measurements. The operations of 1320 may be performed in accordance with examples as disclosed herein. In some examples, aspects of the operations of 1320 may be performed by a measurement reporting component 740 as described with reference to FIG. 7.

Figure 14:
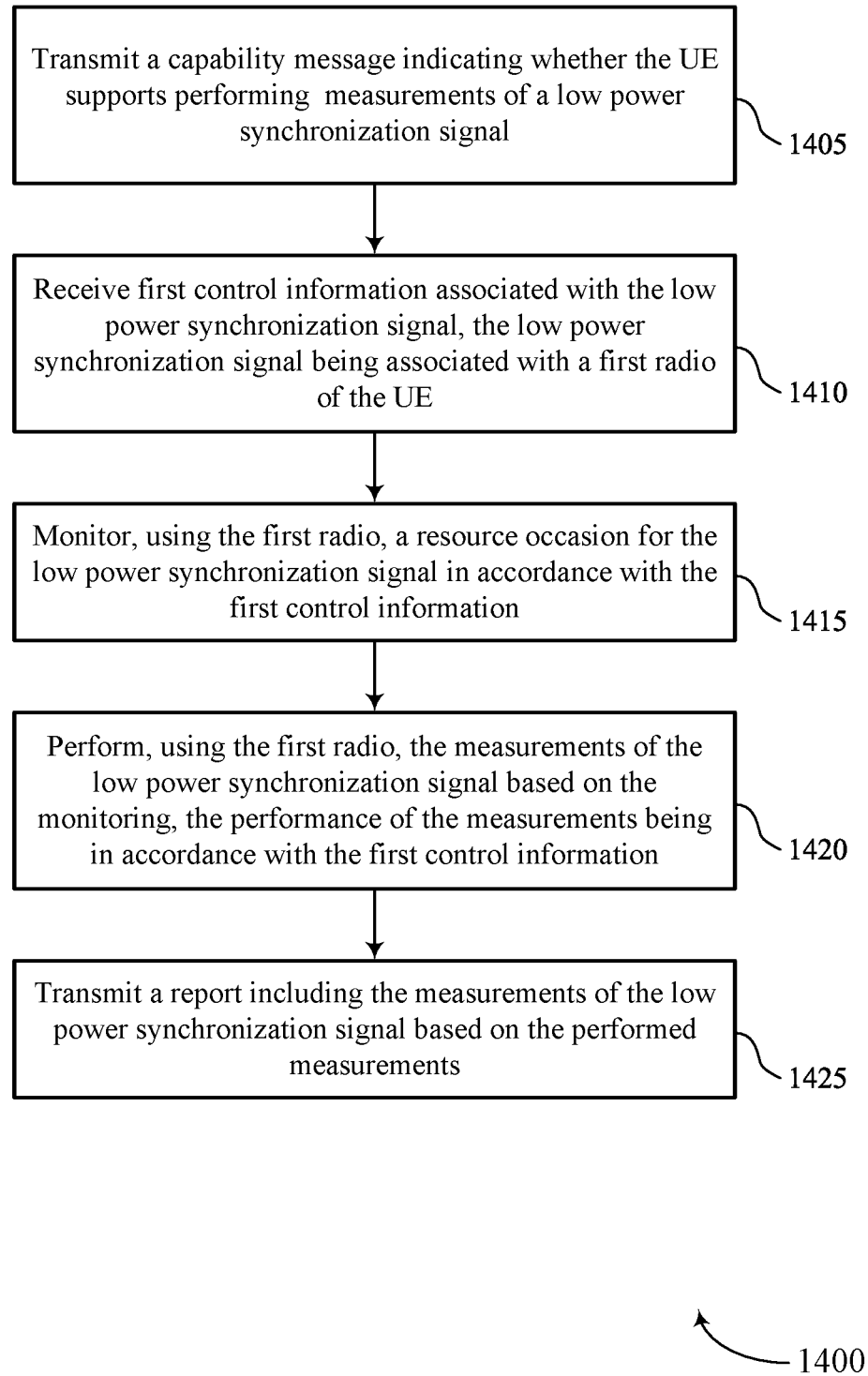

FIG. 14 shows a flowchart illustrating a method 1400 that supports techniques for low power synchronization signal measurements in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include transmitting a capability message indicating whether the UE supports performing measurements of a low power synchronization signal. The operations of 1405 may be performed in accordance with examples as disclosed herein. In some examples, aspects of the operations of 1405 may be performed by a capability component 745 as described with reference to FIG. 7.

At 1410, the method may include receiving first control information associated with the low power synchronization signal, the low power synchronization signal being associated with a first radio of the UE. The operations of 1410 may be performed in accordance with examples as disclosed herein. In some examples, aspects of the operations of 1410 may be performed by a control information component 725 as described with reference to FIG. 7.

At 1415, the method may include monitoring, using the first radio, a resource occasion for the low power synchronization signal in accordance with the first control information. The operations of 1415 may be performed in accordance with examples as disclosed herein. In some examples, aspects of the operations of 1415 may be performed by a low power WUR component 730 as described with reference to FIG. 7.

At 1420, the method may include performing, using the first radio, measurements of the low power synchronization signal based on the monitoring, the performance of the measurements being in accordance with the first control information. The method may also include storing the measurements of the low power synchronization signal and a time stamp associated with the measurements of the low power synchronization signal based at least in part on performing the measurements. The operations of 1420 may be performed in accordance with examples as disclosed herein. In some examples, aspects of the operations of 1420 may be performed by a low power measurement component 735 as described with reference to FIG. 7. Further, in some examples, the measurements may be stored by a measurement logging component 750 in a memory 830 of the UE as described herein with reference to FIGS. 7 and 8.

At 1425, the method may include transmitting a report including the measurements of the low power synchronization signal based on the performed measurements. The operations of 1425 may be performed in accordance with examples as disclosed herein. In some examples, aspects of the operations of 1425 may be performed by a measurement reporting component 740 as described with reference to FIG. 7.

Figure 15:
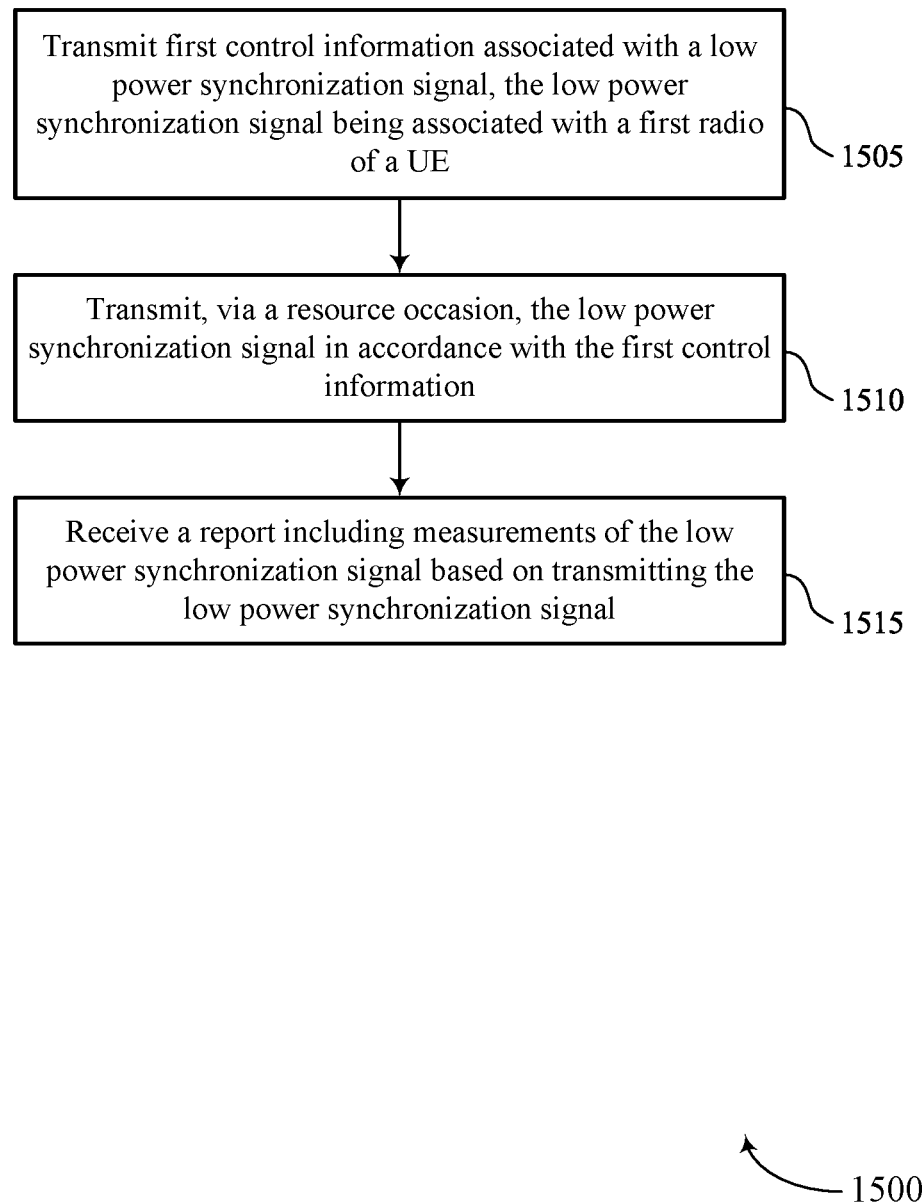

FIG. 15 shows a flowchart illustrating a method 1500 that supports techniques for low power synchronization signal measurements in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting first control information associated with a low power synchronization signal, the low power synchronization signal being associated with a first radio of a UE. The operations of 1505 may be performed in accordance with examples as disclosed herein. In some examples, aspects of the operations of 1505 may be performed by a control information component 1125 as described with reference to FIG. 11.

At 1510, the method may include transmitting, via a resource occasion, the low power synchronization signal in accordance with the first control information. The operations of 1510 may be performed in accordance with examples as disclosed herein. In some examples, aspects of the operations of 1510 may be performed by a low power synchronization signal component 1130 as described with reference to FIG. 11.

At 1515, the method may include receiving a report including measurements of the low power synchronization signal based on transmitting the low power synchronization signal. The operations of 1515 may be performed in accordance with examples as disclosed herein. In some examples, aspects of the operations of 1515 may be performed by an MDT measurement component 1135 as described with reference to FIG. 11.

Figure 16:
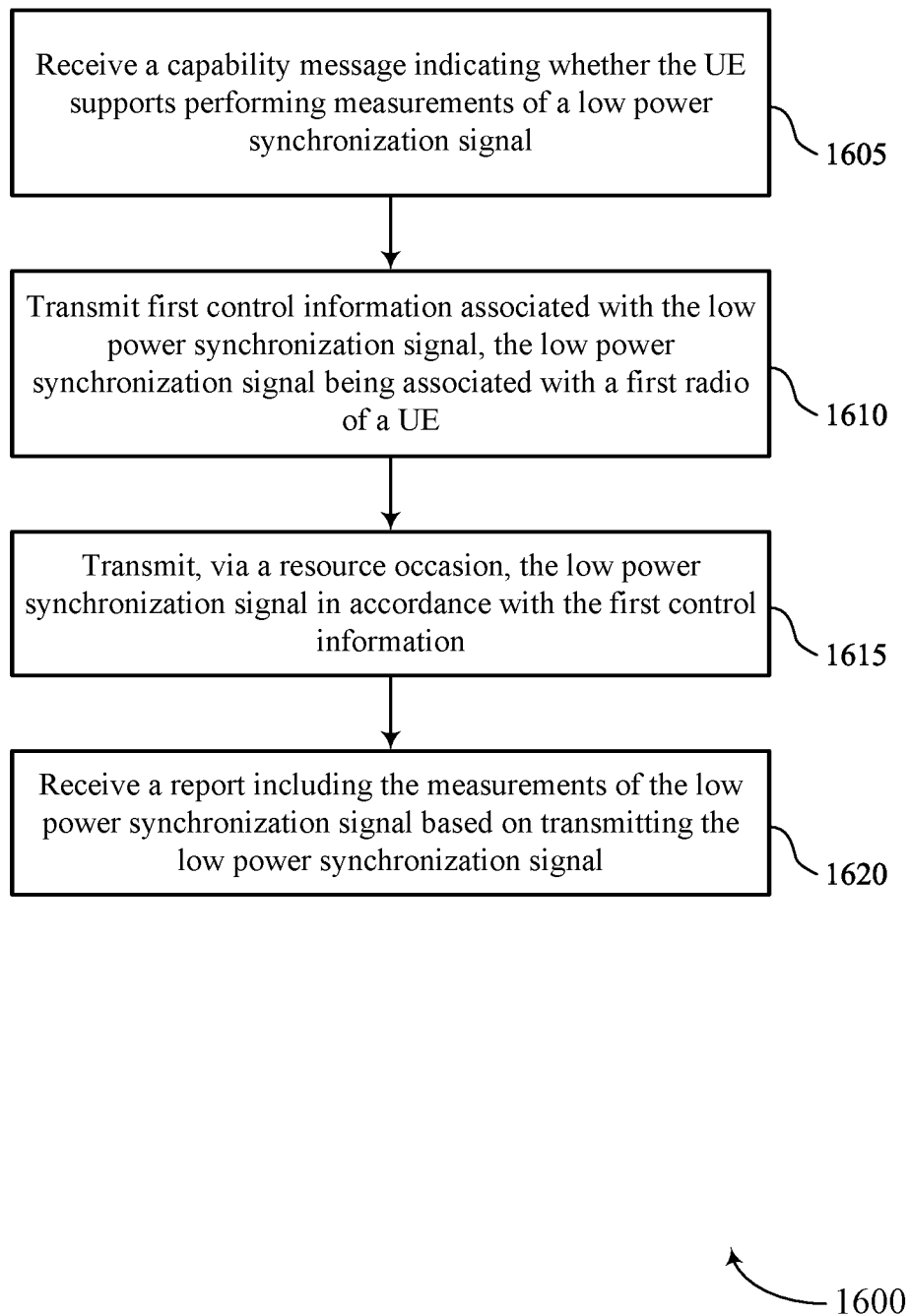

FIG. 16 shows a flowchart illustrating a method 1600 that supports techniques for low power synchronization signal measurements in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include receiving a capability message indicating whether the UE supports performing measurements of a low power synchronization signal. The operations of 1605 may be performed in accordance with examples as disclosed herein. In some examples, aspects of the operations of 1605 may be performed by a UE capability component 1140 as described with reference to FIG. 11.

At 1610, the method may include transmitting first control information associated with a low power synchronization signal, the low power synchronization signal being associated with a first radio of the UE. The operations of 1610 may be performed in accordance with examples as disclosed herein. In some examples, aspects of the operations of 1610 may be performed by a control information component 1125 as described with reference to FIG. 11.

At 1615, the method may include transmitting, via a resource occasion, the low power synchronization signal in accordance with the first control information. The operations of 1615 may be performed in accordance with examples as disclosed herein. In some examples, aspects of the operations of 1615 may be performed by a low power synchronization signal component 1130 as described with reference to FIG. 11.

At 1620, the method may include receiving a report including the measurements of the low power synchronization signal based on transmitting the low power synchronization signal. The operations of 1620 may be performed in accordance with examples as disclosed herein. In some examples, aspects of the operations of 1620 may be performed by an MDT measurement component 1135 as described with reference to FIG. 11.

The following provides an overview of aspects of the present disclosure:

Aspect 1: A method for wireless communications at a UE, comprising: receiving first control information associated with a low power synchronization signal, the low power synchronization signal being associated with a first radio of the UE; monitoring, using the first radio, a resource occasion for the low power synchronization signal in accordance with the first control information; performing, using the first radio, measurements of the low power synchronization signal based at least in part on the monitoring, the performance of the measurements being in accordance with the first control information; and transmitting a report including the measurements of the low power synchronization signal based at least in part on the performed measurements.

Aspect 2: The method of aspect 1, further comprising: transmitting a capability message indicating whether the UE supports performing the measurements of the low power synchronization signal, wherein receiving the first control information is based at least in part on the capability message.

Aspect 3: The method of aspect 2, wherein the capability message further indicates whether the UE supports reporting a subset of the measurements, a filtered set of measurements, or both, transmitting the report including the measurements is based at least in part on the capability message.

Aspect 4: The method of any of aspects 1 through 3, further comprising: storing the measurements of the low power synchronization signal and a time stamp associated with the measurements of the low power synchronization signal based at least in part on performing the measurements, wherein transmitting the report including the measurements is based at least in part on the storing.

Aspect 5: The method of any of aspects 1 through 4, further comprising: receiving, as part of the first control information, an indication of a periodicity of the low power synchronization signal, wherein monitoring the resource occasion for the low power synchronization signal is in accordance with the periodicity.

Aspect 6: The method of any of aspects 1 through 5, further comprising: receiving, as part of the first control information, an indication to measure a power of the low power synchronization signal or a quality of the low power synchronization signal, wherein performing the measurements is in accordance with the first control information.

Aspect 7: The method of any of aspects 1 through 6, further comprising: receiving, as part of the first control information, an indication to report a filtered set of the measurements, a down-sampled set of the measurements, or one or more statistical values of the measurements, wherein transmitting the report is in accordance with the first control information.

Aspect 8: The method of any of aspects 1 through 7, further comprising: transmitting, as part of the report, an indication that the measurements of the low power synchronization signal were performed by the first radio, the first radio being a low power WUR of the UE.

Aspect 9: The method of any of aspects 1 through 8, further comprising: transmitting, as part of the report, measurements of a SSB received at the UE using a second radio, the second radio being a main radio of the UE, wherein the measurements of the low power synchronization signal are modified in accordance with a set of offsets.

Aspect 10: The method of aspect 9, further comprising: receiving second control information indicating the set of offsets for the measurements of the low power synchronization signal, wherein transmitting the report with both the measurements of the SSB and the measurements of the low power synchronization signal is based at least in part on receiving the second control information.

Aspect 11: The method of any of aspects 1 through 10, further comprising: transmitting, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

Aspect 12: The method of aspect 11, further comprising: receiving, as part of the first control information, an indication to include the time offset value and the frequency offset value in the report, wherein transmitting the time offset value and the frequency offset value is based at least in part on the first control information.

Aspect 13: The method of any of aspects 11 through 12, wherein transmitting the time offset value and the frequency offset value is based at least in part on the time offset value satisfying a time error threshold or the frequency offset value satisfying a frequency error threshold.

Aspect 14: The method of any of aspects 11 through 13, wherein transmitting the time offset value and the frequency offset value is based at least in part on a capability of the UE to support performing the measurements of the low power synchronization signal.

Aspect 15: The method of any of aspects 1 through 14, further comprising: receiving a message indicating for the UE to report the measurements of the low power synchronization signal, wherein transmitting the report is based at least in part on receiving the message.

Aspect 16: The method of any of aspects 1 through 15, wherein the first control information further indicates to transmit the report while the UE is operating in one of an inactive mode or a connected mode.

Aspect 17: The method of any of aspects 1 through 16, wherein the first control information further indicates a periodicity associated with transmitting the report, transmitting the report is in accordance with the periodicity.

Aspect 18: The method of any of aspects 1 through 17, wherein the first control information further indicates to transmit the report using one of the first radio of the UE or a second radio of the UE, the first radio being a low power WUR and the second radio being a main radio of the UE.

Aspect 19: A method for wireless communications at a network entity, comprising: transmitting first control information associated with a low power synchronization signal, the low power synchronization signal being associated with a first radio of a UE; transmitting, via a resource occasion, the low power synchronization signal in accordance with the first control information; and receiving a report including measurements of the low power synchronization signal based at least in part on transmitting the low power synchronization signal.

Aspect 20: The method of aspect 19, further comprising: receiving a capability message indicating whether the UE supports performing the measurements of the low power synchronization signal, wherein transmitting the first control information is based at least in part on the capability message.

Aspect 21: The method of aspect 20, wherein the capability message further indicates whether the UE supports reporting a subset of the measurements, a filtered set of measurements, or both, the measurements in the report are based at least in part on the capability message.

Aspect 22: The method of any of aspects 19 through 21, further comprising: transmitting, as part of the first control information, an indication of a periodicity of the low power synchronization signal, wherein transmitting the low power synchronization signal is in accordance with the periodicity.

Aspect 23: The method of any of aspects 19 through 22, further comprising: transmitting, as part of the first control information, an indication for the UE to measure a power of the low power synchronization signal or a quality of the low power synchronization signal, wherein performing the measurements is in accordance with the first control information.

Aspect 24: The method of any of aspects 19 through 23, further comprising: transmitting, as part of the first control information, an indication to report a filtered set of the measurements, a down-sampled set of the measurements, or one or more statistical values of the measurements, wherein transmitting the report is in accordance with the first control information.

Aspect 25: The method of any of aspects 19 through 24, further comprising: receiving, as part of the report, an indication that the measurements of the low power synchronization signal were performed by the first radio of the UE, the first radio being a low power WUR of the UE.

Aspect 26: The method of any of aspects 19 through 25, further comprising: receiving, as part of the report, measurements of a SSB received at the UE using a second radio, the second radio being a main radio of the UE, wherein the measurements of the low power synchronization signal are modified in accordance with a set of offsets.

Aspect 27: The method of aspect 26, further comprising: transmitting second control information indicating the set of offsets for the measurements of the low power synchronization signal, wherein receiving the report that includes both the measurements of the SSB and the measurements of the low power synchronization signal is based at least in part on transmitting the second control information.

Aspect 28: The method of any of aspects 19 through 27, further comprising: receiving, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

Aspect 29: The method of aspect 28, further comprising: transmitting, as part of the first control information, an indication to include the time offset value and the frequency offset value in the report, wherein receiving the time offset value and the frequency offset value is based at least in part on the first control information.

Aspect 30: The method of any of aspects 28 through 29, further comprising: adjusting a periodicity of a low power WUS, a periodicity of the low power synchronization signal, a transmit power of the low power WUS, or a transmit power of the low power synchronization signal based at least in part on the time offset value and the frequency offset value.

Aspect 31: The method of any of aspects 28 through 30, wherein receiving the time offset value and the frequency offset value is based at least in part on the time offset value satisfying a time error threshold or the frequency offset value satisfying a frequency error threshold.

Aspect 32: The method of any of aspects 28 through 31, wherein receiving the time offset value and the frequency offset value is based at least in part on a capability of the UE to support performing the measurements of the low power synchronization signal.

Aspect 33: The method of any of aspects 19 through 32, further comprising: transmitting a message indicating for the UE to report the measurements of the low power synchronization signal, wherein transmitting the report is based at least in part on receiving the message.

Aspect 34: The method of any of aspects 19 through 33, wherein the first control information further indicates to transmit the report while the UE is operating in one of an inactive mode or a connected mode.

Aspect 35: The method of any of aspects 19 through 34, wherein the first control information further indicates a periodicity associated with the report, receiving the report is in accordance with the periodicity.

Aspect 36: The method of any of aspects 19 through 35, wherein the first control information further indicates for the UE to transmit the report using one of the first radio of the UE or a second radio of the UE, the first radio being a low power WUR and the second radio being a main radio of the UE.

Aspect 37: An apparatus for wireless communications at a UE, comprising a processor; memory coupled with the processor; and instructions stored in the memory and executable by the processor to cause the apparatus to perform a method of any of aspects 1 through 18.

Aspect 38: An apparatus for wireless communications at a UE, comprising at least one means for performing a method of any of aspects 1 through 18.

Aspect 39: A non-transitory computer-readable medium storing code for wireless communications at a UE, the code comprising instructions executable by a processor to perform a method of any of aspects 1 through 18.

Aspect 40: An apparatus for wireless communications at a network entity, comprising a processor; memory coupled with the processor; and instructions stored in the memory and executable by the processor to cause the apparatus to perform a method of any of aspects 19 through 36.

Aspect 41: An apparatus for wireless communications at a network entity, comprising at least one means for performing a method of any of aspects 19 through 36.

Aspect 42: A non-transitory computer-readable medium storing code for wireless communications at a network entity, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
   receive first control information associated with a low power synchronization signal, the low power synchronization signal being associated with a first radio of the UE, wherein the first radio comprises a low power wake up radio of the UE, and wherein the first control information includes a measurement configuration for minimization of drive time (MDT) separate from a measurement configuration for synchronization signal blocks (SSBs);
   monitor, using the first radio, a resource occasion for the low power synchronization signal in accordance with the first control information;
   perform, using the first radio, measurements of the low power synchronization signal based at least in part on the monitoring, the performance of the measurements being in accordance with the first control information; and
   transmit a report including the measurements of the low power synchronization signal based at least in part on the performed measurements.

2. The apparatus of claim 1, wherein the instructions are further executable by the processor to cause the apparatus to:
   transmit a capability message indicating whether the UE supports performing the measurements of the low power synchronization signal, wherein receiving the first control information is based at least in part on the capability message.

3. The apparatus of claim 2, wherein:
   the capability message further indicates whether the UE supports reporting a subset of the measurements, a filtered set of measurements, or both, and
   transmitting the report including the measurements is based at least in part on the capability message.

4. The apparatus of claim 1, wherein the instructions are further executable by the processor to cause the apparatus to:
   store the measurements of the low power synchronization signal and a time stamp associated with the measurements of the low power synchronization signal based at least in part on performing the measurements, wherein transmitting the report including the measurements is based at least in part on the storing.

5. The apparatus of claim 1, wherein the instructions are further executable by the processor to cause the apparatus to:
   receive, as part of the first control information, an indication of a periodicity of the low power synchronization signal, wherein monitoring the resource occasion for the low power synchronization signal is in accordance with the periodicity.

6. The apparatus of claim 1, wherein the instructions are further executable by the processor to cause the apparatus to:
   receive, as part of the first control information, an indication to measure a power of the low power synchronization signal or a quality of the low power synchronization signal, wherein performing the measurements is in accordance with the first control information.

7. The apparatus of claim 1, wherein the instructions are further executable by the processor to cause the apparatus to:
   receive, as part of the first control information, an indication to report a filtered set of the measurements, a down-sampled set of the measurements, or one or more statistical values of the measurements, wherein transmitting the report is in accordance with the first control information.

8. The apparatus of claim 1, wherein the instructions are further executable by the processor to cause the apparatus to:
   transmit, as part of the report, an indication that the measurements of the low power synchronization signal were performed by the first radio.

9. The apparatus of claim 1, wherein the instructions are further executable by the processor to cause the apparatus to:
   transmit, as part of the report, measurements of a synchronization signal block received at the UE using a second radio, the second radio being a main radio of the UE, wherein the measurements of the low power synchronization signal are modified in accordance with a set of offsets.

10. The apparatus of claim 9, wherein the instructions are further executable by the processor to cause the apparatus to:
    receive second control information indicating the set of offsets for the measurements of the low power synchronization signal, wherein transmitting the report with both the measurements of the synchronization signal block and the measurements of the low power synchronization signal is based at least in part on receiving the second control information.

11. The apparatus of claim 1, wherein the instructions are further executable by the processor to cause the apparatus to:

transmit, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

12. The apparatus of claim 11, wherein the instructions are further executable by the processor to cause the apparatus to: receive, as part of the first control information, an indication to include the time offset value and the frequency offset value in the report, wherein transmitting the time offset value and the frequency offset value is based at least in part on the first control information.

13. The apparatus of claim 11, wherein transmitting the time offset value and the frequency offset value is based at least in part on the time offset value satisfying a time error threshold or the frequency offset value satisfying a frequency error threshold.

14. The apparatus of claim 11, wherein transmitting the time offset value and the frequency offset value is based at least in part on a capability of the UE to support performing the measurements of the low power synchronization signal.

15. The apparatus of claim 1, wherein the instructions are further executable by the processor to cause the apparatus to: receive a message indicating for the UE to report the measurements of the low power synchronization signal, wherein transmitting the report is based at least in part on receiving the message.

16. The apparatus of claim 1, wherein the first control information further indicates to transmit the report while the UE is operating in one of an inactive mode or a connected mode.

17. The apparatus of claim 1, wherein:
the first control information further indicates a periodicity associated with transmitting the report, and
transmitting the report is in accordance with the periodicity.

18. The apparatus of claim 1, wherein the first control information further indicates to transmit the report using one of the first radio of the UE or a second radio of the UE, the second radio being a main radio of the UE.

19. An apparatus for wireless communications at a network entity, comprising:
a processor;
memory coupled with the processor; and
instructions stored in the memory and executable by the processor to cause the apparatus to:
transmit first control information associated with a low power synchronization signal, the low power synchronization signal being associated with a first radio of a user equipment (UE), wherein the first radio comprises a low power wake up radio of the UE, and wherein the first control information includes a measurement configuration for minimization of drive time (MDT) separate from a measurement configuration for synchronization signal blocks (SSBs);
transmit, via a resource occasion, the low power synchronization signal in accordance with the first control information; and
receive a report including measurements of the low power synchronization signal based at least in part on transmitting the low power synchronization signal.

20. The apparatus of claim 19, wherein the instructions are further executable by the processor to cause the apparatus to: receive a capability message indicating whether the UE supports performing the measurements of the low power synchronization signal, wherein transmitting the first control information is based at least in part on the capability message.

21. The apparatus of claim 20, wherein:
the capability message further indicates whether the UE supports reporting a subset of the measurements, a filtered set of measurements, or both, and
the measurements in the report are based at least in part on the capability message.

22. The apparatus of claim 19, wherein the instructions are further executable by the processor to cause the apparatus to:
transmit, as part of the first control information, an indication of a periodicity of the low power synchronization signal, wherein transmitting the low power synchronization signal is in accordance with the periodicity.

23. The apparatus of claim 19, wherein the instructions are further executable by the processor to cause the apparatus to:
transmit, as part of the first control information, an indication for the UE to measure a power of the low power synchronization signal or a quality of the low power synchronization signal, wherein performing the measurements is in accordance with the first control information.

24. The apparatus of claim 19, wherein the instructions are further executable by the processor to cause the apparatus to:
transmit, as part of the first control information, an indication to report a filtered set of the measurements, a down-sampled set of the measurements, or one or more statistical values of the measurements, wherein transmitting the report is in accordance with the first control information.

25. The apparatus of claim 19, wherein the instructions are further executable by the processor to cause the apparatus to:
receive, as part of the report, an indication that the measurements of the low power synchronization signal were performed by the first radio of the UE.

26. The apparatus of claim 19, wherein the instructions are further executable by the processor to cause the apparatus to:
receive, as part of the report and in addition to the measurements, a time offset value and a frequency offset value associated with the low power synchronization signal, the time offset value indicative of a time drift of the low power synchronization signal and the frequency offset value indicative of a frequency drift of the low power synchronization signal.

27. The apparatus of claim 26, wherein the instructions are further executable by the processor to cause the apparatus to:
transmit, as part of the first control information, an indication to include the time offset value and the frequency offset value in the report, wherein receiving the time offset value and the frequency offset value is based at least in part on the first control information.

28. The apparatus of claim 26, wherein the instructions are further executable by the processor to cause the apparatus to:
adjust a periodicity of a low power wake-up signal, a periodicity of the low power synchronization signal, a transmit power of the low power wake-up signal, or a transmit power of the low power synchronization signal based at least in part on the time offset value and the frequency offset value.

29. A method for wireless communications at a user equipment (UE), comprising:
- receiving first control information associated with a low power synchronization signal, the low power synchronization signal being associated with a first radio of the UE, wherein the first radio comprises a low power wake up radio of the UE, and wherein the first control information includes a measurement configuration for minimization of drive time (MDT) separate from a measurement configuration for synchronization signal blocks (SSBs);
- monitoring, using the first radio, a resource occasion for the low power synchronization signal in accordance with the first control information;
- performing, using the first radio, measurements of the low power synchronization signal based at least in part on the monitoring, the performance of the measurements being in accordance with the first control information; and
- transmitting a report including the measurements of the low power synchronization signal based at least in part on the performed measurements.

30. A method for wireless communications at a network entity, comprising:
- transmitting first control information associated with a low power synchronization signal, the low power synchronization signal being associated with a first radio of a user equipment (UE), wherein the first radio comprises a low power wake up radio of the UE, and wherein the first control information includes a measurement configuration for minimization of drive time (MDT) separate from a measurement configuration for synchronization signal blocks (SSBs);
- transmitting, via a resource occasion, the low power synchronization signal in accordance with the first control information; and
- receiving a report including measurements of the low power synchronization signal based at least in part on transmitting the low power synchronization signal.

* * * * *